US012433703B2

(12) United States Patent
Hashimoto

(10) Patent No.: US 12,433,703 B2
(45) Date of Patent: Oct. 7, 2025

(54) SURGICAL SYSTEM AND CONTROLLING METHOD

(71) Applicant: Kawasaki Jukogyo Kabushiki Kaisha, Kobe (JP)

(72) Inventor: Yasuhiko Hashimoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 618 days.

(21) Appl. No.: 17/774,857

(22) PCT Filed: Nov. 5, 2020

(86) PCT No.: PCT/JP2020/041310
§ 371 (c)(1),
(2) Date: May 6, 2022

(87) PCT Pub. No.: WO2021/090868
PCT Pub. Date: May 14, 2021

(65) Prior Publication Data
US 2022/0401166 A1 Dec. 22, 2022

(30) Foreign Application Priority Data
Nov. 7, 2019 (JP) .................................. 2019-202762

(51) Int. Cl.
A61B 34/32 (2016.01)
A61B 34/00 (2016.01)

(52) U.S. Cl.
CPC .............. A61B 34/32 (2016.02); A61B 34/74 (2016.02); A61B 34/76 (2016.02)

(58) Field of Classification Search
CPC ......... A61B 34/32; A61B 34/74; A61B 34/76; A61B 90/361; A61B 2034/2059; A61B 2034/256; A61B 34/37; A61B 2090/064; A61B 34/30; A61B 2034/305; G16H 20/40; G16H 40/67; G06N 3/044; G06N 3/045; G06N 3/084; G06N 5/01; G06N 20/20; G06N 7/01; B25J 9/1689; G05B 2219/45118
See application file for complete search history.

(56) References Cited

U.S. PATENT DOCUMENTS 10,471,611 B2 * 11/2019 Dooley ................. H04N 7/185
2014/0005684 A1 1/2014 Kim et al.
2014/0046128 A1 2/2014 Lee et al.
2016/0155232 A1 6/2016 Sela et al.
(Continued)

FOREIGN PATENT DOCUMENTS

JP 2014-512848 A 5/2014
JP 2015-527906 A 9/2015
(Continued)

Primary Examiner — Sohana Tanju Khayer
(74) Attorney, Agent, or Firm — XSENSUS LLP

(57) ABSTRACT

A surgical system includes a robot including an instrument manipulator that has a surgical instrument, a control device that controls the robot, and a user interface that receives an input of a command and outputs the command to the control device. The control device generates an automatic operational command for causing the robot to automatically perform a surgical operation, and controls the surgical operation of the robot according to the automatic operational command.

15 Claims, 11 Drawing Sheets

(56) References Cited

U.S. PATENT DOCUMENTS

| | | | |
|---|---|---|---|
| 2018/0060524 A1 | 3/2018 | Krimsky | |
| 2019/0200977 A1* | 7/2019 | Shelton, IV | A61B 34/35 |
| 2019/0201116 A1* | 7/2019 | Shelton, IV | G16H 30/40 |
| 2019/0201142 A1 | 7/2019 | Shelton, IV et al. | |
| 2019/0246882 A1* | 8/2019 | Graetzel | A61B 1/0016 |
| 2019/0262084 A1 | 8/2019 | Roh et al. | |
| 2019/0328470 A1 | 10/2019 | Tojo et al. | |
| 2019/0355149 A1* | 11/2019 | Avendi | G06T 7/74 |
| 2020/0078078 A1* | 3/2020 | Henderson | A61B 50/22 |
| 2020/0170713 A1* | 6/2020 | Sakuragi | G06T 7/12 |
| 2020/0170723 A1* | 6/2020 | Crawford | A61B 34/10 |
| 2020/0197110 A1* | 6/2020 | Marshall | B25J 9/104 |
| 2020/0367979 A1* | 11/2020 | Laakso | A61B 34/37 |
| 2021/0030501 A1* | 2/2021 | Eyre | A61B 34/37 |
| 2021/0068907 A1* | 3/2021 | Fuerst | A61B 90/361 |
| 2021/0212773 A1* | 7/2021 | Feather | A61B 90/361 |
| 2022/0104944 A1* | 4/2022 | Cohen | A61F 2/2436 |

FOREIGN PATENT DOCUMENTS

| | | |
|---|---|---|
| JP | 2019-188038 A | 10/2019 |
| WO | 2012/094637 A2 | 7/2012 |
| WO | 2017033356 A1 | 3/2017 |
| WO | 2017/085811 A1 | 5/2017 |
| WO | 2019/171468 A1 | 9/2019 |
| WO | 2021/115857 A1 | 6/2021 |
| WO | 2021/118750 A1 | 6/2021 |

\* cited by examiner

SURGICAL SYSTEM AND CONTROLLING METHOD

CROSS-REFERENCE TO RELATED APPLICATIONS

This application is based on PCT filing PCT/JP2020/041310, filed Nov. 5, 2020, which claims the priority of Japanese Patent Application No. 2019-202762 filed in Japan Patent Office on Nov. 7, 2019, each of which is incorporated as a part of this application with reference to the entirety.

TECHNICAL FIELD

The present disclosure relates to a surgical system and a controlling method.

BACKGROUND ART

Conventionally, robots are used in order to assist a surgical operation. For example, Patent Document 1 discloses a surgical system provided with an instrument manipulator. The instrument manipulator has an instrument manipulator arm, and a surgical instrument is attached to a distal end thereof. In this surgical system, a user interface accepts a surgeon's command, and the surgical instrument is moved corresponding to an actual translation amount and an actual rotation amount which are obtained by multiplying a translation amount and a rotation amount of the surgical instrument which are received at the user interface, by given magnification values, respectively. The magnification value of the translation amount differs from the magnification value of the rotation amount.

REFERENCE DOCUMENT OF CONVENTIONAL ART

Patent Document

[Patent Document 1] JP2019-188038A

DESCRIPTION OF THE DISCLOSER

As disclosed in Patent Document 1, a robot which assists the surgical operation is conventionally configured to perform operation corresponding to the operation inputted into the user interface by an operator, such as the surgeon. Therefore, the operation result greatly depends on the operator's surgical capability or the capability of operating the robot.

One purpose of the present disclosure is to provide a surgical system and a controlling method, which enable an efficient surgical operation using a robot.

In order to achieve the purpose, a surgical system according to the present disclosure includes a robot having an instrument manipulator to which a surgical instrument is provided, a control device that controls the robot, and a user interface that accepts an input of a command and outputs the command to the control device. The control device includes an operation processing module that generates an automatic operational command for causing the robot to automatically perform a surgical operation, and controls the surgical operation of the robot according to the automatic operational command.

According to the technique of the present disclosure, an efficient surgical operation using a robot becomes possible.

MODES FOR CARRYING OUT THE DISCLOSURE

Figure 1:
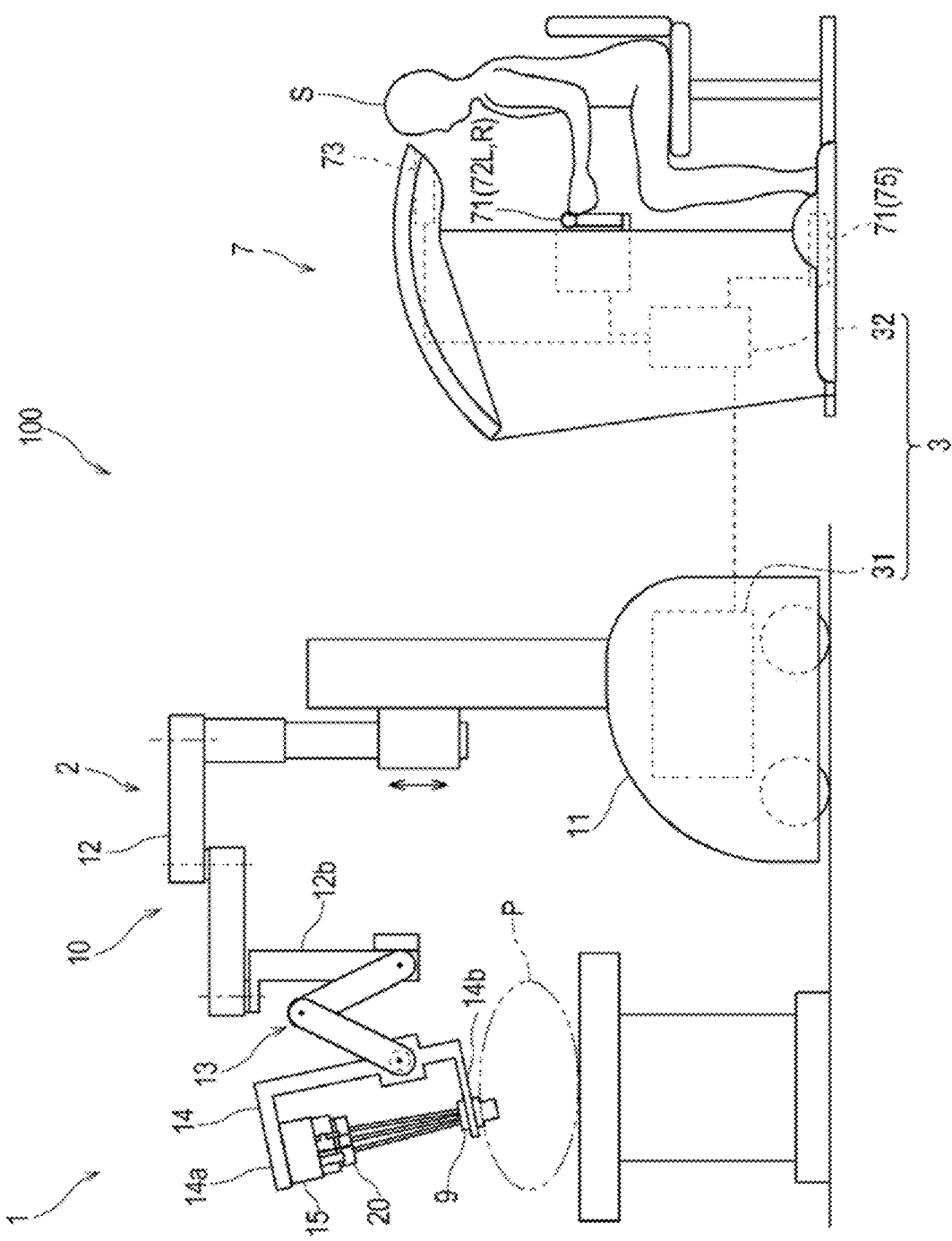
FIG. 1 is a view illustrating one example of a configuration of a surgical system according to one embodiment.

First, each example of the aspects of the present disclosure is described. A surgical system according to one aspect of the present disclosure includes a robot having an instrument manipulator to which a surgical instrument is provided, a control device that controls the robot, and a user interface that accepts (receives) an input of a command and outputs the command to the control device. The control device includes an operation processing module that generates an automatic operational command for causing the robot to automatically perform a surgical operation, and controls the surgical operation of the robot according to the automatic operational command. According to this aspect, the surgical operation of the robot is automated, thus an efficient surgical operation using the robot becomes possible.

In the surgical system according to one aspect of the present disclosure, the control device may further include a memory that stores automatic operation information that is information for causing the robot to automatically perform a given surgical operation, and the operation processing module may generate the automatic operational command according to the automatic operation information. According to this aspect, by causing the robot to perform the automatic operation that is an operation in accordance with the automatic operation information stored in the memory beforehand, the automation of the surgical operation of the robot becomes possible.

In the surgical system according to one aspect of the present disclosure, the operation processing module may accept, from the user interface, corrective manipulation information that is manipulation information for correcting operation of the robot automatically performing the surgical operation according to the automatic operational command, and control the robot to perform a corrective operation that is operation corrected from the operation according to the automatic operational command, and the operation processing module may store, in the memory, information for causing the robot to perform the corrective operation as the automatic operation information. According to this aspect, by an operator operating (manipulating) to correct the automatic operation in accordance with the automatic operation information stored in the memory beforehand, more appropriate automatic operation information to which the surgical technique of the operator is reflected can be generated. Therefore, the skill of the operator can be handed down to the surgical system.

In the surgical system according to one aspect of the present disclosure, the operation processing module may control the surgical operation of the robot according to the automatic operational command generated using the latest automatic operation information stored in the memory. According to this aspect, the operator repeatedly performs the correction of the automatic operation of the robot in accordance with the automatic operation information, and accordingly, the automatic operation of the robot can be brought closer to the surgical operation intended by the operator.

In the surgical system according to one aspect of the present disclosure, the memory may store a plurality of automatic operation information, and the operation processing module may select the automatic operation information to be used for generating the automatic operational command from the plurality of automatic operation information stored in the memory. According to this aspect, the appropriate automatic operation information corresponding to the surgical operation can be selected, and the robot can be caused to perform the appropriate automatic operation.

In the surgical system according to one aspect of the present disclosure, the memory may store a plurality of automatic operation information, and the operation processing module may generate new automatic operation information by using the plurality of automatic operation information stored in the memory. According to this aspect, new automatic operation information in which, for example, the advantage of the plurality of automatic operation information is emphasized and the disadvantage of the plurality of automatic operation information is supplemented, can be generated. Therefore, the automatic operation information closer to the realization of the intended surgical operation can be generated.

In the surgical system according to one aspect of the present disclosure, the control device may further include a first machine learning model, and a memory that stores operational information of the robot, and first information indicative of a manual operation of the robot or a corrective operation performed to the automatic operation of the robot. The first machine learning model may carry out machine learning using the operational information and the first information corresponding to the operational information.

The first machine learning model after the learning may use the operational information as input data, and use a correspondence operational command corresponding to the operational information as output data. The operation processing module may generate the automatic operational command based on the correspondence operational command of the first machine learning model.

According to this aspect, when the first machine learning model receives the input of the operational information of the robot, it outputs the correspondence operational command in order to generate the next automatic operational command to the robot with the concerned operational information. Thus, based on the operational information of the robot, the surgical system determines the next operation to be performed by the robot with the concerned operational information, and causes the robot to perform the automatic operation. Proceeding the machine learning of the first machine learning model improves the accuracy of the output data of the first machine learning model (i.e., the accuracy of the operation to be performed by the robot next). Moreover, the first information indicates the operation of the robot which is operated by the operator. Thus, the first machine learning model learns the surgical technique of the operator by performing the machine learning using the first information, and the first machine learning model after learning can output the optimal output data based on the leaned various surgical technique. Therefore, the skill of the operator can be handed down to the surgical system.

In the surgical system according to one aspect of the present disclosure, the control device may further include a second machine learning model, and a memory that stores image data of a target part of processing of the surgical operation of the robot, and second information indicative of operation of the robot to the target part of the image data. The second machine learning model may carry out machine learning using the image data of the target part, and the second information for the target part of the image data. The second machine learning model after the learning may use the image data as input data, and use a correspondence operational command corresponding to the image data as output data. The operation processing module may generate the automatic operational command based on the correspondence operational command of the second machine learning model.

According to this aspect, when the second machine learning model receives the input of the image data of the target part, it outputs the correspondence operational command in order to generate the next automatic operational command for the robot to the target part in the image data. Thus, based on the image data of the target part, the surgical system determines the next operation to be performed by the robot to the target part in a state of the image data, and causes the robot to perform the automatic operation.

Proceeding the machine learning of the second machine learning model improves the accuracy of the output data of the second machine learning model (i.e., the accuracy of the operation to be performed by the robot next). Moreover, the second information indicates the operation of the robot which is operated by the operator. Thus, the second machine learning model learns the surgical technique and an image identifying technique of the operator by performing the machine learning using the second information, and the second machine learning model after learning can output the optimal output data based on the leaned various surgical technique and image identifying technique. Therefore, the skill of the operator can be handed down to the surgical system.

In the surgical system according to one aspect of the present disclosure, the robot may further be provided with an endoscope manipulator to which an endoscope camera is attached. The second machine learning model may use image data captured by the endoscope camera as the image data of the target part. According to this aspect, since the endoscope camera can be utilized to acquire the image data of the target part of the processing in the surgical operation of the robot, a new camera is not required to be provided.

In the surgical system according to one aspect of the present disclosure, the operation processing module may accept, from the user interface, an input of a command for specifying a start point and an end point for the robot to automatically perform the surgical operation, and cause the robot to automatically perform the surgical operation for a part between the start point and the end point. According to this aspect, since the start point and the end point are specified by the operator, determining the start point and the end point becomes easy, and the accuracy of the positions of the determined start point and end point is high.

The surgical system according to one aspect of the present disclosure may further include a camera that images a surgery target area. The control device may include an image processing module that specifies the surgery target area by processing an image of the surgery target area imaged by the camera, and a determining module that determines a start point and an end point of a surgical operation in the surgery target area specified by the image processing module. The operation processing module may cause the robot to automatically perform the surgical operation for a part between the start point and the end point. According to this aspect, the automation of the procedure of determining the start point and the end point becomes possible.

In the surgical system according to one aspect of the present disclosure, the operation processing module may accept, from the user interface, manual manipulation information that is manipulation information for causing the robot to perform a surgical operation by a manual operation, generate a manual operational command for operating the robot according to the manual manipulation information, and control a surgical operation of the robot according to the manual operational command. At least either before or after the control of the robot according to the automatic operational command, the operation processing module may accept the manual manipulation information, and control the robot according to the manual operational command. According to this aspect, for one surgical target part, a procedure by the manual operation of the robot in accordance with the manual operational command and a procedure by the automatic operation by the robot can be applied. For example, the procedures suitable for each of the manual operation and the automatic operation of the robot can be applied to the surgical target part.

In the surgical system according to one aspect of the present disclosure, the user interface may include a plurality of user interfaces, and the operation processing module may accept, from one selected from the plurality of user interfaces, manual manipulation information that is manipulation information for causing the robot to perform a surgical operation by a manual operation, generate a manual operational command for operating the robot according to the manual manipulation information, and control the surgical operation of the robot according to the manual operational command. According to this aspect, among the plurality of the user interfaces, the manual operation of the robot using the one selected user interface is performed.

In the surgical system according to one aspect of the present disclosure, the robot may include a plurality of robots, and the user interface may include a plurality of user interfaces. The control device may further include a connection controlling module that selectively connects one of the plurality of robots to one of the plurality of user interfaces, and a memory that stores a combination of the robot and the user interface during a surgery, and an executing order of the combinations. The connection controlling module may connect the selected one of the plurality of robots to the selected one of the plurality of user interfaces according to the combination and the executing order of the combinations stored in the memory. According to this aspect, for one surgical target part, the surgical operation can be performed using the plurality of combinations of the user interfaces and according to the executing order of the combinations. Therefore, the surgical operation suitable for the combination can automatically be carried out by each combination, and thus, the surgery can be performed appropriately.

In the surgical system according to one aspect of the present disclosure, the robot may include a plurality of robots, and the user interface may include a plurality of user interfaces. The control device may further include a connection controlling module that selectively connects one of the plurality of robots to one of the plurality of user interfaces. The connection controlling module may accept, from at least one of the plurality of user interfaces, an input of a command for specifying a combination of the robot and the user interface during a surgery, and an executing order of the combinations, and connect the selected one of the plurality of robots to the selected one of the plurality of user interfaces. According to this aspect, for one surgical target part, the surgical operation can be performed using the plurality of combinations of the robots and the user interfaces and according to the executing order of the combinations. The determination of the combination and the executing order using the user interface can be possible. Therefore, the determination and the change of the combination and the executing order can be possible by the operator.

A controlling method according to one aspect of the present disclosure is a method of controlling a robot that performs a surgical operation, which includes the steps of generating an automatic operational command for causing the robot to automatically perform the surgical operation, and causing the robot to perform the surgical operation according to the automatic operational command. According to this aspect, similar effects to the surgical system according to the one aspect of the present disclosure can be obtained.

In the controlling method according to one aspect of the present disclosure, the automatic operational command may be generated according to automatic operation information that is information stored in a memory and for causing the robot to automatically perform a given surgical operation.

In the controlling method according to one aspect of the present disclosure, corrective manipulation information that is manipulation information for correcting operation of the robot that automatically performs the surgical operation according to the automatic operational command may be accepted from the user interface. Based on the accepted corrective manipulation information, the robot may be operated to perform a corrective operation that is operation corrected from the operation according to the automatic operational command, and information for the robot to perform the corrective operation may be stored in the memory as the automatic operation information.

In the controlling method according to one aspect of the present disclosure, the operational information of the robot may be inputted into a first machine learning model as input data, and the first machine learning model may output a correspondence operational command of the robot as output data. The automatic operational command may be generated based on the correspondence operational command. The first machine learning model may carry out machine learning using first information indicative of a manual operation of the robot or a corrective operation performed to the automatic operation of the robot by using the user interface, and the operational information corresponding to the first information. The correspondence operational command outputted from the first machine learning model may be a command corresponding to the operational information of the robot.

In the controlling method according to one aspect of the present disclosure, image data of a target part of processing of a surgical operation of the robot may be inputted into a second machine learning model as input data, and the second machine learning model may output a correspondence operational command of the robot as output data. The automatic operational command may be generated based on the correspondence operational command. The second machine learning model may carry out machine learning using image data of the target part, and second information indicative of operation of the robot to the target part of the image data. The correspondence operational command outputted from the second machine learning model may be a command corresponding to the operational information of the robot.

Hereinafter, one embodiment of the present disclosure is described with reference to the drawings. Note that this embodiment which will be described below illustrates a comprehensive or concrete example. Further, components which are not described in the independent claims indicating the top concept among components in the following embodiment are described as arbitrary components. Each figure in the accompanying drawings is a schematic figure, and is not necessarily illustrated exactly. In each drawing, the same reference characters are assigned to substantially the same components, and therefore, redundant explanation may be omitted or simplified. The term "device (apparatus)" as used in this specification and the claims may not only mean a sole device (apparatus), but may also mean a system comprised of a plurality of devices (apparatuses).

[Configuration of Surgical System]

A configuration of a surgical system 100 according to this embodiment is described. FIG. 1 is a view illustrating one example of the configuration of the surgical system 100 according to this embodiment. As illustrated in FIG. 1, the surgical system 100 includes a robot 1, a console 7, and a control device 3. The control device 3 includes a first control device 31 and a second control device 32. In this embodiment, although the robot 1 is a robot which performs a laparoscopy surgery, it may be a robot which conducts any kind of surgery, such as a robot provided with a plurality of arms with respective surgical instruments.

In this embodiment, the surgical system 100 is a system utilizing a master-slave type robot 1. The console 7 constitutes a master and the robot 1 constitutes a slave. In the surgical system 100, an operator S, such as a surgeon, operates (manipulates) a user interface 71 of the console 7 to input a command into the user interface 71, and the robot 1 performs operation corresponding to this command, thereby performing a surgical operation. In addition, in the surgical system 100, the robot 1 can automatically (autonomously) perform a given surgical operation, without receiving the operation (manipulation) by the operator S using the user interface 71.

In this embodiment, the surgical system 100 can cause the robot 1 to perform a surgical operation in a "manual operation mode," an "automatic (autonomous) operation mode," and a "corrective automatic (autonomous) operation mode." The "manual operation mode," the "automatic operation mode," and the "corrective automatic operation mode" do not include an instruction which teaches the robot 1 a surgical operation (may also be referred to as the "teaching").

The manual operation mode is an operation mode for operating the robot 1 according to the command inputted via the user interface 71. For example, the robot 1 performs operation according to the manual operation (manual manipulation) which is operation inputted into the user interface 71 by the operator S (i.e., operation which traces the manual operation). The robot 1 is manually operated by the operator S.

The automatic operation mode is an operation mode for operating the robot 1 according to a task program set beforehand. The robot 1 performs an automatic operation in which it automatically (autonomously) performs a given surgical operation according to the task program. Examples of the given surgical operation include incision, suture, cutting, excision, extraction of a piece of tissue, etc. The automatic operation mode is distinguished from the corrective automatic operation mode (described later) in that the operation of the user interface 71 is not reflected to the operation of the robot 1 during the automatic operation of the robot 1.

Further, the automatic operation mode includes three operation modes. The first automatic operation mode is an operation mode in which the robot 1 automatically performs a surgical operation according to the automatic operation information which is information set beforehand, such as the teaching information. The automatic operation information may be updated by new automatic operation information when executing the corrective automatic operation mode. That is, the newest automatic operation information is generated.

The second automatic operation mode is an operation mode in which the robot 1 automatically performs a surgical operation according to a correspondence operational command which is a command outputted from a first machine learning model. The first machine learning model carries out a machine learning using first information indicative of a manual operation of the robot 1 in the manual operation performed using the user interface 71, or an operation obtained by correcting the automatic operation of the robot 1 by using the user interface 71, and operational information of the robot 1 corresponding to the first information. Further, the first machine learning model after learning uses operational information of the robot 1 as input data, and uses correspondence operational command corresponding to the operational information as output data.

The third automatic operation mode is an operation mode in which the robot 1 automatically performs a surgical operation according to the correspondence operational command outputted from a second machine learning model. The second machine learning model carries out a machine learning using image data of a target part of processing of the surgical operation by the robot 1, and operational information of the robot 1 for the target part of the image data. Further, the second machine learning model after learning uses image data of the target part as input data, and uses correspondence operational command as output data.

The corrective automatic operation mode is an operation mode in which, while the robot 1 is automatically (autonomously) performing a surgical operation, operation to be performed automatically is corrected by reflecting the operation (manipulation) inputted into the user interface 71 to the automatic operation of the robot 1. That is, the robot 1 operates automatically in a state where it is able to reflect the command inputted via the user interface 71. Therefore, the corrective automatic operation mode is corrective of the operation of the robot 1 which automatically performs the surgical operation. The corrective automatic operation mode includes a case where an automatic operation in the first automatic operation mode is used, a case where an automatic operation of the second automatic operation mode is used, and a case where an automatic operation of the third automatic operation mode is used, as the automatic operation to be corrected.

Note that the surgical system 100 may perform all the operation modes described above, or may perform only partially. For example, in the latter case, the surgical system 100 may perform the manual operation mode, one of the first to third automatic operation modes, and the corrective automatic operation mode using the automatic operation mode.

[Configuration of Robot]

One example of the configuration of the robot 1 is described. Note that the configuration of the robot 1 is not limited to the configuration described below, as long as it is capable of performing a surgical operation. As illustrated in FIG. 1, the robot 1 constitutes an interface between the surgical system 100 and a patient P. For example, the robot 1 is disposed near a surgical table where the patient P lies in a surgical room which is a sterile field. The robot 1 includes a robot body 2 and the first control device 31. The robot body 2 includes a plurality of surgical manipulators 20, a single entry guide 9, and a positioner 10 which positions the surgical manipulator 20 and the entry guide 9 with respect to the patient P.

The entry guide 9 is attached to a cannula (not illustrated) detained on the body surface of the patient P. The entry guide 9 is a member which guides the plurality of surgical manipulators 20, and the plurality of surgical manipulators 20 pass through a hole of the entry guide 9. The positioner 10 includes a horizontal articulated manipulator 12, a support member 12b, a vertical articulated manipulator 13, and a support frame 14. The horizontal articulated manipulator 12 is supported by a carriage 11. The support member 12b is provided to a distal-end part of the horizontal articulated manipulator 12 on the basis of the carriage 11. The vertical articulated manipulator 13 is supported by the horizontal articulated manipulator 12 via the support member 12b. The support frame 14 is provided to a distal-end part of the vertical articulated manipulator 13 on the basis of the support member 12b. Note that the configuration of the positioner 10 is not limited to the configuration described above, as long as it is capable of positioning the entry guide 9 to a target position (including the posture) with sufficient accuracy.

The support frame 14 includes opposite parts 14a and 14b which oppose to each other with a space therebetween. The entry guide 9 is disposed at and supported by the opposite part 14b. A support block 15 which collectively supports the plurality of surgical manipulators 20 is disposed at and supported by the opposite part 14a. The plurality of surgical manipulators 20 are located between the opposite parts 14a and 14b. The plurality of surgical manipulators 20 include instrument manipulator(s) 20a (see FIG. 2) each having a surgical instrument (not illustrated), and endoscope manipulator(s) 20b (see FIG. 2) each having an endoscope camera (not illustrated).

The surgical instrument means an actual controlled part which is inserted into a surgical target part in the abdominal cavity of the patient P, and is drivable from the outside of the abdominal cavity in order to perform a desired processing or a desired medical function for the target tissue in the surgical target part. For example, the surgical instrument is provided with a pair of jaws. The surgical instrument may be forceps, a gripper, scissors, a stapler, a needle holder, or an electric scalpel. The surgical instrument may be an electrically-driven apparatus, such as an electronic surgery electrode(s), a transducer, and a sensor. The surgical instrument may be a nozzle which supplies fluid for inhalation, insufflation, cleaning, treating fluid, accessory introduction, biopsy extraction, etc. For example, the endoscope camera may include an objective lens and a light guide.

[Configuration of First Control Device]

The first control device 31 controls operation of the entire robot body 2. For example, the first control device 31 is a computer apparatus. As illustrated in FIG. 1, the first control device 31 is communicatably connected with the console 7. The first control device 31 operates the robot body 2 in each operation mode in response to a command accepted (received) by the console 7. The first control device 31 transmits information to the console 7 for displaying an endoscope image of the endoscope camera on the console 7, causing the console 7 to perform operation corresponding to the operation of the robot body 2, etc.

The first control device 31 has a positioner control function for controlling operation of the positioner 10 so that the entry guide 9 is positioned in a given position and a given posture. The horizontal articulated manipulator 12 and the vertical articulated manipulator 13 of the positioner 10 are each provided with a drive at each joint. Each drive includes a servomotor which is one example of an electric motor for driving the joint, a rotation sensor, such as an encoder, which detects a rotational amount of the joint, a current sensor which detects driving current of the servomotor, and a power transmission mechanism, such as a reduction gear, which transmits the driving force of the servomotor to the joint (none of them is illustrated), but not all of them is essential.

The first control device 31 has a surgical instrument control function for controlling operation of each instrument manipulator 20a. The first control device 31 has a function for controlling operation of the surgical instrument, and a function for controlling operation of the instrument manipulator 20a so that the surgical instrument becomes in the position and the posture corresponding to the command. Each instrument manipulator 20a includes a plurality of joints, and each joint is provided with a drive. Each drive includes a servomotor which is one example of an electric motor for driving the joint, a rotation sensor, such as an encoder, which detects a rotational amount of the joint, a current sensor which detects driving current of the servomotor, and a power transmission mechanism, such as a reduction gear, which transmits the driving force of the servomotor to the joint (none of them is illustrated), but not all of them is essential.

The first control device 31 has an endoscope control function for controlling operation of the endoscope manipulator 20b. The first control device 31 has a function for controlling operation of the endoscope camera, and a function for controlling operation of the endoscope manipulator 20b to cause the endoscope camera to become in the position and the posture corresponding to the command. The endoscope manipulator 20b includes a plurality of joints, and each joint is provided with a drive. Each drive includes an electric motor, such as a servomotor, which drives the joint, a rotation sensor, such as an encoder, which detects a rotational amount of the joint, a current sensor which detects driving current of the servomotor, and a power transmission mechanism, such as a reduction gear, which transmits the driving force of the servomotor to the joint (none of them is illustrated), but not all of them is essential.

The first control device 31 is comprised of a calculator having a processor and a memory. The calculator communicates information, data, a command, etc. with other devices including the console 7. The calculator accepts an input of a detection signal from each of various sensors, and outputs a control signal to each controlled target. The memory is comprised of a semiconductor memory, such as a volatile memory and a nonvolatile memory, and a storage device, such as a hard disk drive and an SSD (Solid State Drive). For example, the memory stores a program executed by the calculator, various fixed data, etc.

The function of the calculator may be realized by a computer system (not illustrated) comprised of a processor, such as a CPU (Central Processing Unit), a volatile memory, such as a RAM (Random Access Memory), and a nonvolatile memories, such as a ROM (Read-Only Memory). A part or all of the function of the calculator may be realized by the CPU executing a program recorded on the ROM using the RAM as a work area. Note that a part or all of the function of the calculator may be realized by the computer system described above, or may be realized by hardware circuitry for exclusive use, such as an electronic circuit or an integrated circuit, or may be realized by a combination of the computer system and the hardware circuitry which are described above. Note that the first control device 31 may execute each processing by a centralized control of a sole computer apparatus, or may execute each processing by a distributed control of a collaboration of a plurality of computer apparatuses.

Further, for example, the first control device 31 may be comprised of a microcontroller, an MPU (Micro Processing Unit), an LSI (Large Scale Integration), a system LSI, a PLC (Programmable Logic Controller), a logical circuit, etc. The plurality of functions of the first control device 31 may be realized by forming each function as one chip, or may be realized by forming a part or all of the functions as one chip. Alternatively, the circuit may be a general-purpose circuit, or may be a circuit for exclusive use. As the LSI, an FPGA (Field Programmable Gate Array) which can be programmed after LSI production, a reconfigurable processor in which the connection and/or the setting of a circuit cell inside the LSI can be reconfigured, or an ASIC (Application Specific Integrated Circuit) where circuits having a plurality of functions are bundled into one circuit for a particular application, may be used.

[Configuration of Console]

A configuration of the console 7 is described. As illustrated in FIG. 1, the console 7 is a device for constituting an interface between the surgical system 100 and the operator S, and operating the robot body 2. The console 7 is installed inside a surgical room, near the surgical table or away from the surgical table, or installed outside the surgical room.

The console 7 includes the user interface 71 for accepting (receiving) an input of a command from the operator S, a display unit 73 which displays an image captured by the endoscope camera, and the second control device 32. The user interface 71 includes a pair of left and right operation manipulators 72L and 72R, and an operation pedal 75. The operation manipulators 72L and 72R are devices used for manually operating the robot body 2. The second control device 32 may be comprised of a computer apparatus etc. similarly to the first control device 31.

Each of the operation manipulators 72L and 72R has a controlled part (not illustrated) at a distal-end part thereof, and the controlled part receives an operational force from the operator S. In this embodiment, each of the operation manipulators 72L and 72R is a user interface which receives a movement command, such as a position and a posture of the endoscope camera and the surgical instrument. For example, the operation pedal 75 is a user interface which accepts a command, such as zooming of the endoscope camera, switching of a control mode, switching of an operation mode, switching of the instrument manipulator associated with the operation manipulator 72L or 72R.

The user interface 71 further includes a user interface which accepts an input of a body cavity insertion command of the surgical instrument, a user interface which accepts an input of a manipulator return command, etc. These user interfaces may be commonly used by one of the operation manipulators 72L and 72R and the operation pedal 75, or may be realized by providing an additional known user interface, such as a lever, a button, a touch panel, a joystick, a motion capture, etc. The user interface 71 may have a drive mechanism (not illustrated) for giving a reaction force to the operational force of the operator S to the controlled part.

When manually operating the robot body 2, the operator S commands a movement of an end effector of the manipulator of the robot body 2 by directly moving the controlled parts of the operation manipulators 72L and 72R, while looking at an affected part through the endoscope image displayed on the display unit 73. For example, the manipulator of the robot body 2 is the instrument manipulator 20a or the endoscope manipulator 20b associated with the operation manipulators 72L or 72R by an operation of the operation pedal 75, and the end effector is the surgical instrument or the endoscope camera.

[Configuration of Second Control Device]

The second control device 32 controls operation of the entire console 7. For example, the second control device 32 is a computer apparatus similarly to the first control device 31. As illustrated in FIG. 1, the second control device 32 is connected communicatably to the first control device 31. For example, the second control device 32 transmits the information, the command, etc. which are accepted by the user interface 71 to the first control device 31. Further, the second control device 32 controls operation performed by the operation manipulators 72L and 72R etc., image display operation of the display unit 73, etc. based on the information, data, the command, etc. which are accepted from the first control device 31. A part or all of the function of the second control device 32 may be realized by a computer system (not illustrated) comprised of a CPU, a RAM, and a ROM, or may be realized by a hardware circuitry for exclusive use, such as an electronic circuit or an integrated circuit, or may be realized by a combination of the computer system and the hardware circuitry which are described above. Note that the second control device 32 may execute each processing by a centralized control of a sole computer apparatus, or may execute each processing by a distributed control of a collaboration of a plurality of computer apparatuses. The second control device 32 and the first control device 31 may be included in the sole computer apparatus.

Figure 2:
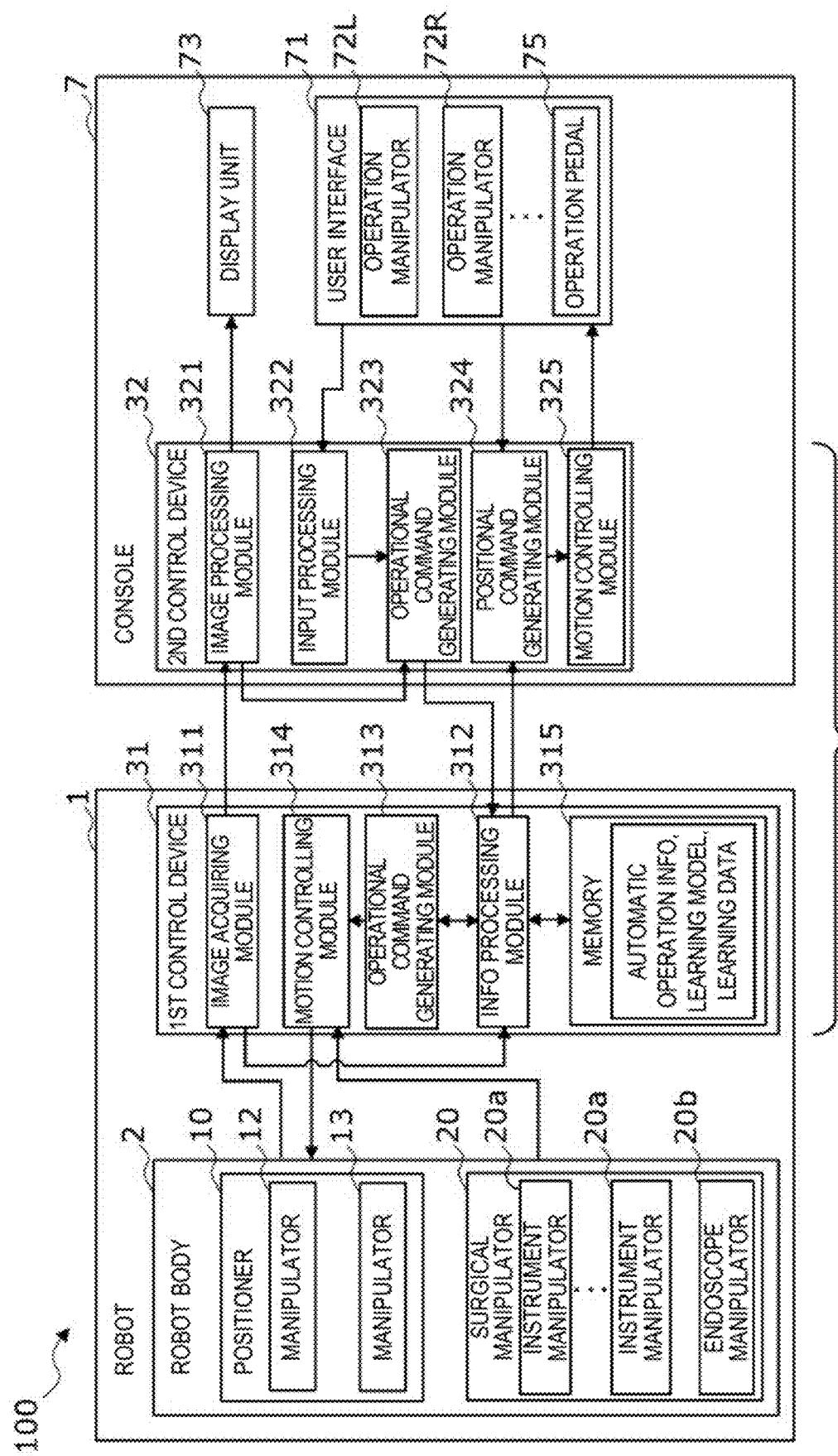
FIG. 2 is a block diagram illustrating one example of a functional configuration of a control device according to this embodiment.

A functional configuration of the second control device 32 is described. FIG. 2 is a block diagram illustrating one example of the functional configuration of the control device 3 according to this embodiment. As illustrated in FIG. 2, the second control device 32 includes, as functional components, an image processing module 321, an input processing module 322, an operational command generating module 323, a positional command generating module 324, and a motion controlling module 325. The functions of the functional components described above are realized by a processor etc. Not all the functional components described above are essential.

The image processing module 321 receives image data captured by the endoscope camera from the first control device 31, and outputs and displays the image data on the display unit 73. The image processing module 321 may apply a conversion process etc. to the image data, and output it to the display unit 73.

The input processing module 322 detects a rotational amount of each joint based on a detection value of the rotation sensor provided to each joint of the operation manipulators 72L and 72R, and detects a position and a speed (moving speed) of the controlled part based on the rotational amount of each joint. The operational command generating module 323 generates a movement command for instructing the position and the speed to the manipulator of the robot body 2 based on the position and the speed of the controlled part which are detected by the input processing module 322. Note that a force sensor which detects a force applied to each of the operation manipulators 72L and 72R may be provided. The input processing module 322 may detect a detection value of the force, such as magnitude and a direction of the force based on the detection value of the force sensor. The operational command generating module 323 may generate a force command for instructing the magnitude and the direction of the force which is applied by the manipulator of the robot body 2 to the target object, based on the detection value of the force. The operational command generating module 323 may generate the movement command based on an acceleration corresponding to the detection value of the force. The operational command generating module 323 transmits a manipulation operational command including the movement command and the force command to the first control device 31. The manipulation operational command is an example of manipulation information.

The positional command generating module 324 receives the positional command from the first control device 31. The positional command includes a command, such as the position and the posture of the manipulator of the robot body 2, and, for example, it includes a command, such as the position and the posture of each joint of the manipulator. The positional command generating module 324 generates an operation positional command for instructing the position and the posture of the controlled part of each of the operation manipulators 72L and 72R based on the positional command and the movement command which are received so that the position and the posture of the controlled part of each of the operation manipulators 72L and 72R correspond to those of the end effector of the manipulator of the robot body 2. The operation positional command may include the reaction force which is given to the controlled part of each of the operation manipulators 72L and 72R. The positional command generating module 324 detects the position of each joint based on the detection value of the rotation sensor provided to each joint of the operation manipulators 72L and 72R. The motion controlling module 325 determines a driving torque of each joint based on the operation positional command and the position of each joint of the operation manipulators 72L and 72R, and supplies current corresponding to the driving torque to the servomotor of the corresponding joint. As a result, the movement is made so that the position and the posture of the controlled part of each of the operation manipulators 72L and 72R correspond to the position and the posture of the end effector of the manipulator of the robot body 2, etc.

[Functional Configuration of First Control Device]

A functional configuration of the first control device 31 is described. As illustrated in FIG. 2, the first control device 31 includes, as functional components, an image acquiring module 311, an information processing module 312, an operational command generating module 313, a motion controlling module 314, and a memory 315. The functions of the functional components other than the memory 315 are realized by a processor etc., and the function of the memory 315 is realized by a memory. Not all the functional components described above are essential. The image acquiring module 311, the information processing module 312, the operational command generating module 313, and the motion controlling module 314 are examples of an operation processing module.

The memory 315 can store various information, and allows a read from the stored information. For example, the memory 315 can store the automatic operation information, such as teaching information. The memory 315 can store a first machine learning model, and first learning data which is learning data accumulated in order for the first machine learning model to use it for learning. The memory 315 can store a second machine learning model, and second learning data which is learning data accumulated in order for the second machine learning model to use it for learning.

Here, the first machine learning model and the second machine learning model are models which carry out machine learning, and improve the accuracy of output data with respect to input data by learning using the learning data. The first machine learning model and the second machine learning model are each comprised of a learning model, such as a neural network, Random Forest, Genetic Programming, a regression model, a tree model, a Bayesian model, a time-series model, a clustering model, and an ensemble learning model. In this embodiment, the first machine learning model and the second machine learning model are each comprised of a neural network.

The neural network is comprised of a plurality of nodes layers including an input layer and an output layer. The node layer includes one or more nodes. When the neural network is comprised of an input layer, a middle layer, and an output layer, the neural network sequentially performs an output process from the input layer to the middle layer and an output process from the middle layer to the output layer, for information inputted into the nodes of the input layer, and outputs an output result which suits the inputted information. Note that each node of one layer is connected to each node of the next layer, and a connection between the nodes is weighted. The information on the node of one layer is weighted as given to the connection between the nodes, and is outputted to a node of the next layer.

Alternatively, the neural network may be a recurrent neural network. The recurrent neural network handles time-series information. Input data of the recurrent neural network includes data at the present time, and output data of the middle layer in the recurrent neural network at a past time before the present time. The recurrent neural network has a network structure in consideration of the time-series information. Since such a recurrent neural network outputs in consideration of temporal behavior of the input data, it can improve the accuracy of the output data. The first machine learning model and the second machine learning model are each preferably a recurrent neural network because it handles the time-series data.

The image acquiring module 311 acquires the image data captured by the endoscope camera, and transmits it to the second control device 32. Further, the image acquiring module 311 may output the image data described above to the information processing module 312.

The information processing module 312 receives the movement command and the force command from the second control device 32, and outputs them to the operational command generating module 313. The information processing module 312 may process the movement command and the force command, and output them to the operational command generating module 313. The information processing module 312 reads the automatic operation information from the memory 315 based on the command of the operation mode which is received from the second control device 32, and outputs it to the operational command generating module 313. The information processing module 312 may process the automatic operation information and output it to the operational command generating module 313.

The information processing module 312 receives the operational information of the manipulator of the robot body 2 from the operational command generating module 313, inputs the operational information into the first machine learning model, and outputs the correspondence operational command which is the output data of the first machine learning model, to the operational command generating module 313.

The information processing module 312 accepts the image data captured by the endoscope camera from the image acquiring module 311, inputs the image data into the second machine learning model, and outputs the correspondence operational command which is the output data of the second machine learning model, to the operational command generating module 313. The information processing module 312 may perform image processing to the image data, and output it to the second machine learning model.

Here, the operational information of the manipulator of the robot body 2 includes the operation data. The operation data includes at least one of positional data indicative of the positions of the manipulator and the end effector during operation, and the force data indicative of a force applied to a target object by the end effector. The positional data may include a position in a three-dimensional space, and a posture in the three-dimensional space. The force data may include a magnitude of the force, and a direction of the force in the three-dimensional space. The positional data and the force data may be time-series data associated with each position and an occurrence time of each force.

Further, the operational information may include, as information other than the operation data, imaging data of the target object to which the end effector of the manipulator of the robot body 2 applied an action, oscillating data occurred at the end effector, impact data, optical data, sound data, temperature data, humidity data, and pressure data such as atmospheric pressure. The operational information handled in the above embodiment at least includes the operation data.

Further, the information processing module 312 receives the positional command from the operational command generating module 313, and transmits the positional command to the second control device 32.

The operational command generating module 313 generates the operational command based on the movement command, the force command, the automatic operation information, or the correspondence operational command which are received from the information processing module 312. The operational command may include the positional command, and may further include the force command. The positional command may be applied with a restriction of the movable range and a restriction of the moving speed which are set beforehand.

Here, the positional command may include a command for instructing target values or correction values of the position and the posture of the end effector and/or each joint of the manipulator of the robot body 2, and the speeds of the position and the posture. The position and its speed may indicate the position and the speed in the three-dimensional space, and the posture and its speed may indicate the posture and the speed in the three-dimensional space. In this specification and the claims, the "position" means at least the position in the three-dimensional space, which may also include, in addition to the position in the three-dimensional space, the speed of the position, the posture, and the speed of the posture. The force command includes a command for instructing the target value or the correction value of the magnitude and the direction of the force which is applied to the target object by the end effector of the manipulator of the robot body 2. The direction of the force may indicate a direction of in the three-dimensional space.

The motion controlling module 314 supplies current to the servomotor which drives each joint of the manipulator of the robot body 2. In detail, the motion controlling module 314 receives, as feedback information, the detection values of the rotation amount and the current from the rotation sensor and the current sensor provided to the servomotor of each joint of the manipulator of the robot body 2. Note that the motion controlling module 314 may use the command value of the current supplied by the drive circuit of the servomotor to the servomotor as the feedback information. Further, when the force sensor is provided to the end effector of the manipulator of the robot body 2, the motion controlling module 314 receives the detection value of the force from the force sensor as the feedback information. The motion controlling module 314 detects the position of each joint based on the detection value of the rotational amount of each joint of the manipulator of the robot body 2, and determines a driving amount and a driving speed of each joint based on the positional command of the operational command and the position of each joint. Further, the motion controlling module 314 determines a driving torque of each joint based on the detection value of the force of the end effector of the manipulator of the robot body 2, and the force command of the operational command. The motion controlling module 314 determines a current value for driving each servomotor corresponding to the driving amount, the driving speed, and the driving torque based on the detection value of the current, and supplies current of the current value to the servomotor. Therefore, for example, when operating according to the movement command, the manipulator of the robot body 2 operates corresponding to the motion of the controlled part of each of the operation manipulators 72L and 72R.

[Operation of Surgical System]
[Manual Operation Mode]

Figure 3:
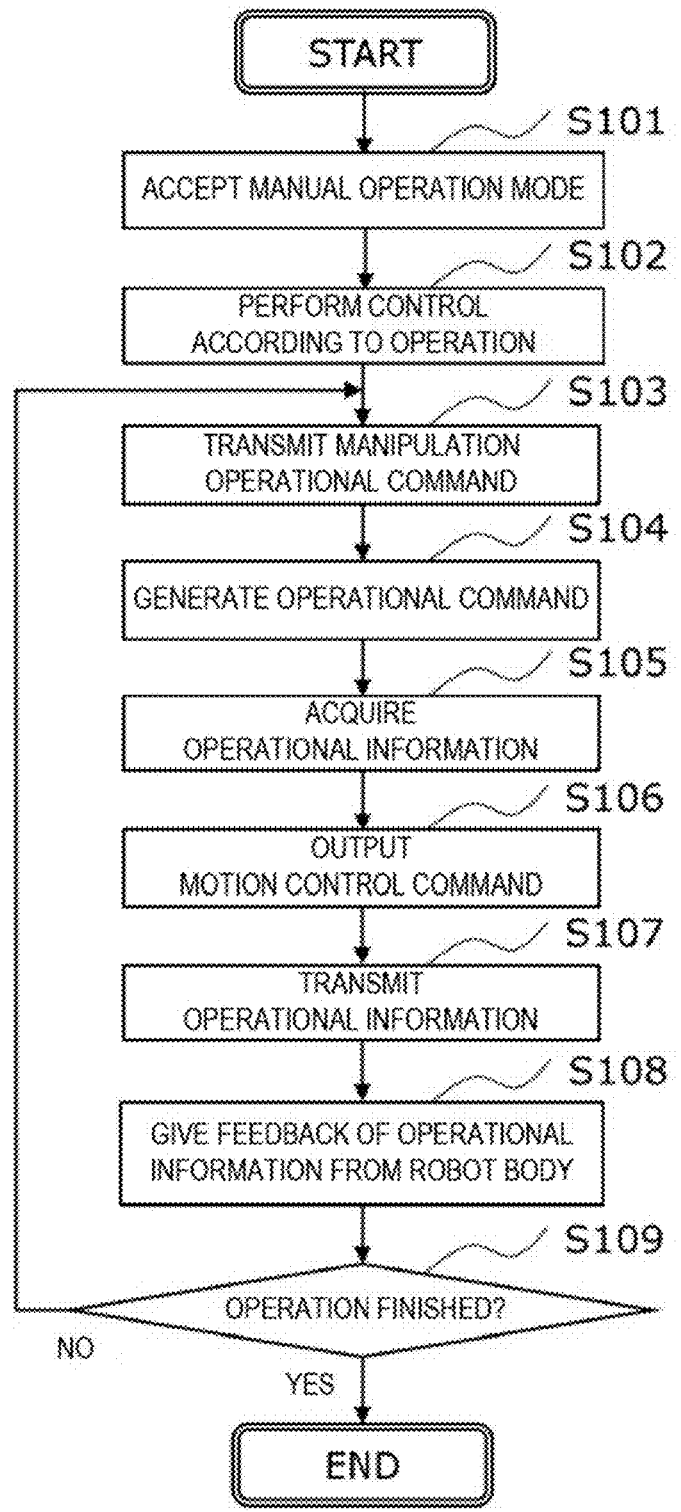
FIG. 3 is a flowchart illustrating one example of operation for performing a manual operation mode in the surgical system according to this embodiment.

Operation of the surgical system 100 according to this embodiment in the manual operation mode when performing a surgery to a patient is described. FIG. 3 is a flowchart illustrating one example of operation for executing the manual operation mode of the surgical system 100 according to this embodiment. As illustrated in FIG. 3, the operator S inputs an execution command of the manual operation mode by using the operation pedal 75 of the user interface 71, when performing a surgery to the patient. The second control device 32 receives the execution command of the manual operation mode, and transmits the command to the first control device 31 (Step S101).

Next, the first control device 31 performs a control for operating the robot body 2 according to the operation which is given to the operation manipulators 72L and 72R of the user interface 71 by the operator S (Step S102).

Next, the second control device 32 generates the manipulation operational command corresponding to the operation given to the operation manipulators 72L and 72R by the operator S, and transmits it to the first control device 31 (Step S103). Next, the first control device 31 generates a manual operational command which is an operational command based on the manipulation operational command (Step S104). Further, the first control device 31 acquires the operational information from the robot body 2 (Step S105). Further, the first control device 31 generates a motion control command for causing the robot body 2 to perform the operation corresponding to the manual operational command, by using the operational information as the feedback information, and outputs it to the robot body 2 (Step S106). Therefore, the robot body 2 operates according to the motion control command. The manipulation operational command is an example of manual manipulation information.

Further, the first control device 31 acquires the operational information from the robot body 2, and transmits it to the second control device 32 (Step S107). Next, the second control device 32 generates the operation positional command based on the operational information, and the manipulation operational command transmitted to the first control device 31, and operates the operation manipulators 72L and 72R according to the operation positional command. That is, the second control device 32 gives a feedback of the operational information from the robot body 2 to the operation manipulators 72L and 72R (Step S108).

Next, the second control device 32 determines whether the operation of the robot body 2 in the manual operation mode is finished (Step S109). If finished (Yes at Step S109), it ends the series of processings, and, if not finished (No at Step S109), it returns to Step S103.

[Automatic Operation Mode]

Figure 4:
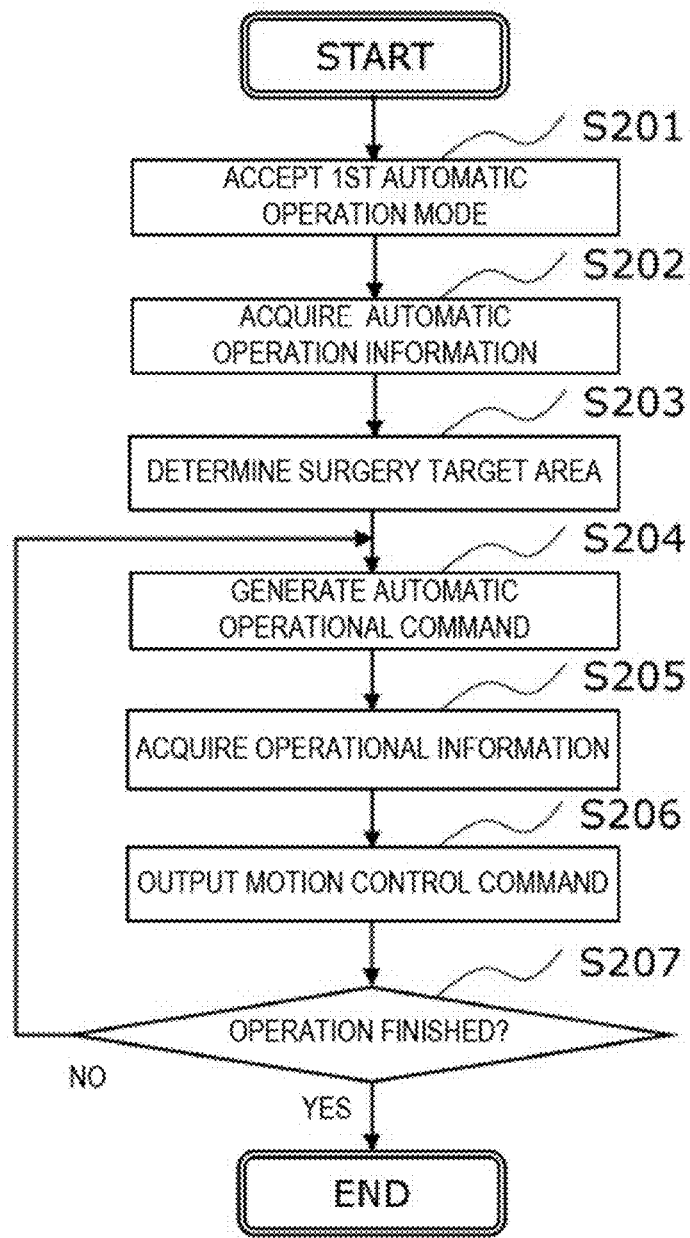
FIG. 4 is a flowchart illustrating one example of operation for performing a first automatic operation mode in the surgical system according to this embodiment.

Operation of the surgical system 100 according to this embodiment in the automatic operation mode when performing a surgery to the patient is described. First, operation in the first automatic operation mode is described. FIG. 4 is a flowchart illustrating one example of operation for performing the first automatic operation mode of the surgical system 100 according to this embodiment. As illustrated in FIG. 4, when performing a surgery to the patient, the operator S inputs an execution command of the first automatic operation mode, and information on a target surgery by using the operation pedal 75 etc. of the user interface 71. The second control device 32 accepts the execution command of the first automatic operation mode, and the information on the target surgery, and transmits the command and the information to the first control device 31 (Step S201). The information on the target surgery may include information on the classification of the target part of the surgery, the contents of the surgery, the contents of the surgical operation performed by the robot body 2.

Next, the first control device 31 searches the automatic operation information stored in the memory 315, and reads and acquires the automatic operation information corresponding to the information on the target surgery (Step S202).

The operator S operates the operation manipulators 72L and 72R of the user interface 71 and operates the manipulator of the robot body 2 to perform an input for specifying a surgery target area. The surgery target area is a target area where the robot body 2 performs the surgical operation. The first control device 31 determines a position and a range of the surgery target area based on the input (Step S203). For example, when the end effector of the manipulator of the robot body 2 is located at each of a start point and an end point of the surgery target area, by the operator S performing the input to the user interface 71, the first control device 31 may determine each position of the end effector as the start point and the end point of the surgery target area. For example, when the surgical operation is an incision or a suture, the start point and the end point are a start point and an end point of the incision or the suture. The first control device 31 can function as a determining module.

Note that the operator S may operate the operation manipulators 72L and 72R of the user interface 71, make the endoscope camera of the endoscope manipulator 20b of the robot body 2 image the surgery target area, and perform the inputs for specifying the surgery target area, the start point, and the end point by using the user interface 71, on the image displayed on the display unit 73. Alternatively, the first control device 31 may specify the surgery target area, the start point, and the end point by carrying out image processing of the image described above. The method of specifying the surgery target area is not limited to the method described above, but may be any kind of method (for example, the surgery target area may be set beforehand and may be stored in the memory 315).

Next, the first control device 31 generates an automatic operational command by using the automatic operation information (Step S204). Further, the first control device 31 acquires the operational information from the robot body 2 (Step S205), generates the motion control command corresponding to the automatic operational command by using the operational information as the feedback information, and outputs it to the robot body 2 (Step S206).

Next, the first control device 31 determines whether all the operations of the robot body 2 according to the automatic operation information are finished (Step S207), and if finished (Yes at Step S207), it ends the series of processings and, if not finished (No at Step S207), it returns to Step S204.

Figure 5:
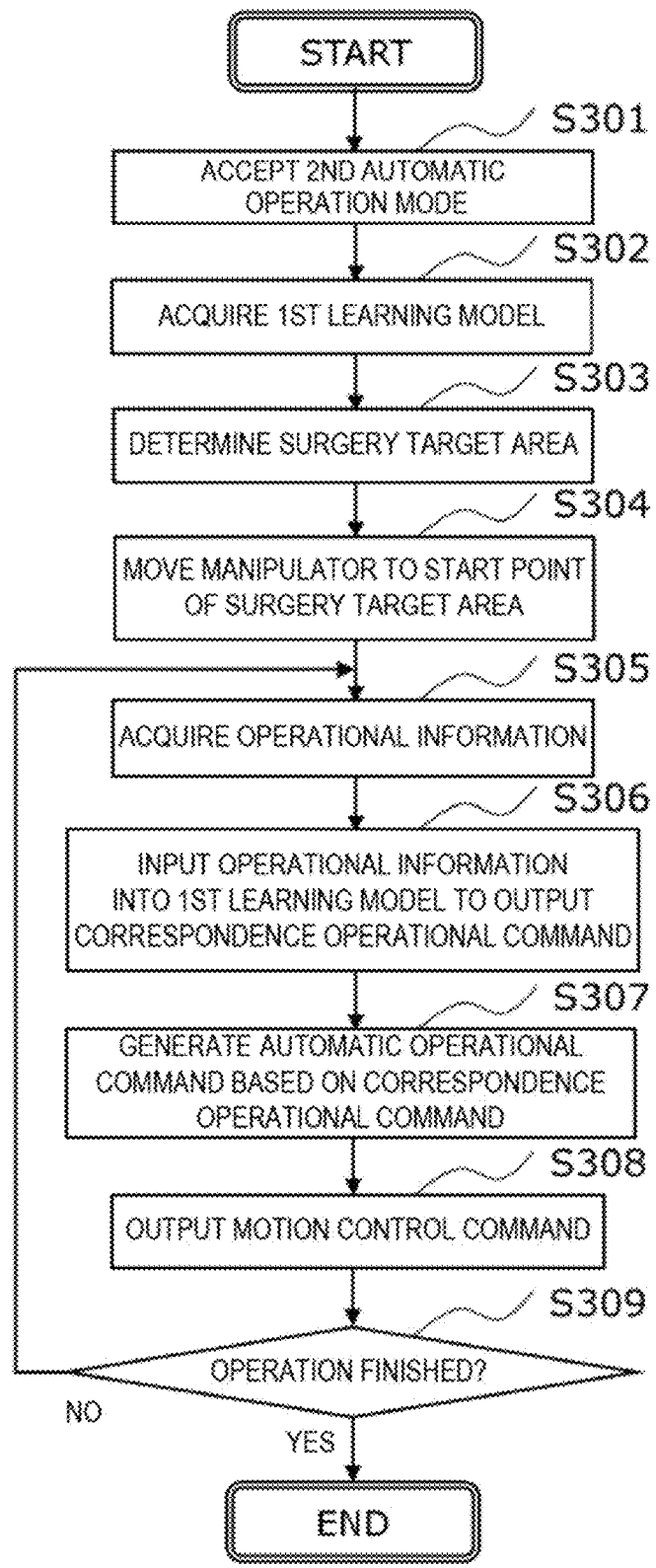
FIG. 5 is a flowchart illustrating one example of operation for performing a second automatic operation mode in the surgical system according to this embodiment.

Next, operation in the second automatic operation mode is described. FIG. 5 is a flowchart illustrating one example of operation for performing the second automatic operation mode of the surgical system 100 according to this embodiment. As illustrated in FIG. 5, the operator S inputs the execution command of the second automatic operation mode and the information on the target surgery by using the operation pedal 75 etc. of the user interface 71, when performing a surgery to the patient. The second control device 32 accepts the execution command of the second automatic operation mode and the information on the target surgery, and transmits the command and the information to the first control device 31 (Step S301).

Next, the first control device 31 searches the first machine learning model stored in the memory 315, and reads and acquires the first machine learning model corresponding to the information on the target surgery (Step S302).

Next, the first control device 31 determines the position and the range of the surgery target area based on the input to the user interface 71 by the operator S (Step S303). Next, the operator S operates the operation manipulators 72L and 72R of the user interface 71, and moves the end effector of the manipulator of the robot body 2 to the start point of the surgery target area (Step S304). After moving to the start point, the operator S inputs the command for executing the surgical operation into the user interface 71, and the first control device 31 receives the command.

Next, the first control device 31 acquires the operational information from the robot body 2 (Step S305). Further, the first control device 31 inputs the information on the surgery target area which includes the position and the range of the surgery target area, and the operational information of the robot body 2, into the first machine learning model (Step S306). The first machine learning model outputs the correspondence operational command corresponding to the operational information. The correspondence operational command is a command indicative of the surgical operation to be performed by the robot body 2 in the state of the operational information. For example, processing at Step S306 is performed by the information processing module 312 of the first control device 31.

Next, the first control device 31 generates an automatic operational command based on the correspondence operational command (Step S307). Further, the first control device 31 generates the motion control command corresponding to the automatic operational command by using the operational information acquired at Step S305 as the feedback information, and outputs it to the robot body 2 (Step S308).

Next, the first control device 31 determines whether all the surgical operations of the robot body 2 to the surgery target area are finished (Step S309). If finished (Yes at Step S309), it ends the series of processings and, if not finished (No at Step S309), it returns to Step S305. For example, the first control device 31 may repeat the series of processings at Steps S305-S309 at every given period. Therefore, the first control device 31 can cause the robot body 2 to perform the surgical operation corresponding to the operating state of the robot body 2 based on the output data of the first machine learning model corresponding to the operational information of the robot body 2 at every given period.

Figure 6:
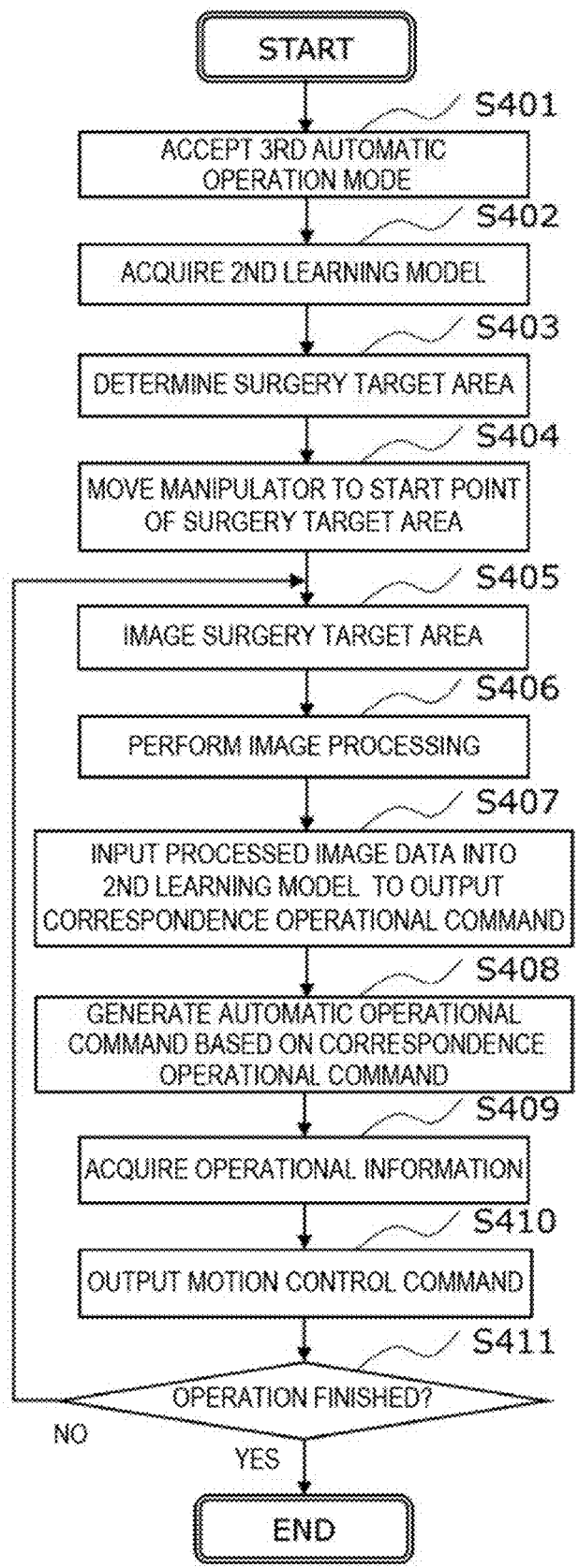
FIG. 6 is a flowchart illustrating one example of operation for performing a third automatic operation mode in the surgical system according to this embodiment.

Next, operation in the third automatic operation mode is described. FIG. 6 is a flowchart illustrating one example of operation for performing the third automatic operation mode of the surgical system 100 according to this embodiment. As illustrated in FIG. 6, when performing a surgery to the patient, the operator S inputs an execution command of the third automatic operation mode, and information on the target surgery by using the operation pedal 75 etc. of the user interface 71. The second control device 32 accepts the execution command of the third automatic operation mode and the information on the target surgery, and transmits the command and the information to the first control device 31 (Step S401).

Next, the first control device 31 searches the second machine learning model stored in the memory 315, and reads and acquires the second machine learning model corresponding to the information on the target surgery (Step S402).

Next, the first control device 31 determines the position and the range of the surgery target area based on the input to the user interface 71 by the operator S (Step S403). Next, the operator S operates the operation manipulators 72L and 72R of the user interface 71, and moves the end effector of the manipulator of the robot body 2 to the start point of the surgery target area (Step S404). After moving to the start point, the operator S inputs the command for executing the surgical operation into the user interface 71, and the first control device 31 receives the command.

Next, the first control device 31 makes the endoscope camera of the endoscope manipulator 20b of the robot body 2 image the surgery target area (Step S405). Further, the first control device 31 performs image processing to the image captured by the endoscope camera (Step S406). The contents of the image processing is not limited in particular, but may be set according to the surgery target area, the state of the affected part of the surgery target area, and the surgical operation applied. For example, the image processing may be processing for detecting a three-dimensional position of a photographic subject projected to each pixel of the image. Further, the image processing may be filtering of the image. The filtering may be processing for removing noise of pixel values, processing for exaggerating a difference in the pixel value, etc. Further, the image processing may be processing for changing a color tone of the image by changing the pixel value. By such image processing, a conversion of the surgery target area into a three-dimensional image, an exaggeration of the affected part, etc. become possible. The first control device 31 may perform one or more image processing, and generate the processed image data for every image processing. For example, processing at Step S406 is performed by the information processing module 312.

Next, the first control device 31 inputs the image data processed at Step S406 into the second machine learning model (Step S407). The second machine learning model outputs the correspondence operational command corresponding to the processed image data. The correspondence operational command is a command indicative of a surgical operation to be performed by the robot body 2 to the surgery target area in the state of the processed image data. For example, processing at Step S407 is performed by the information processing module 312 of the first control device 31.

Next, the first control device 31 generates an automatic operational command based on the correspondence operational command (Step S408). The first control device 31 acquires the operational information from the robot body 2 (Step S409). The first control device 31 generates the motion control command corresponding to the automatic operational command by using the operational information described above as the feedback information, and outputs it to the robot body 2 (Step S410).

Next, the first control device 31 determines whether all the surgical operations of the robot body 2 to the surgery target area are finished (Step S411). If finished (Yes at Step S411), it ends the series of processings and, if not finished (No at Step S411), it returns to Step S405. For example, the first control device 31 may repeat the series of processings at Steps S405-S411 at every given period. Therefore, the first control device 31 can cause the robot body 2 to perform the surgical operation corresponding to the state of the surgery target area based on the output data of the second machine learning model corresponding to the state of the surgery target area at every given period.

[Corrective Automatic Mode]
[Corrective Automatic Operation Mode in First Automatic Operation Mode]

Figure 7:
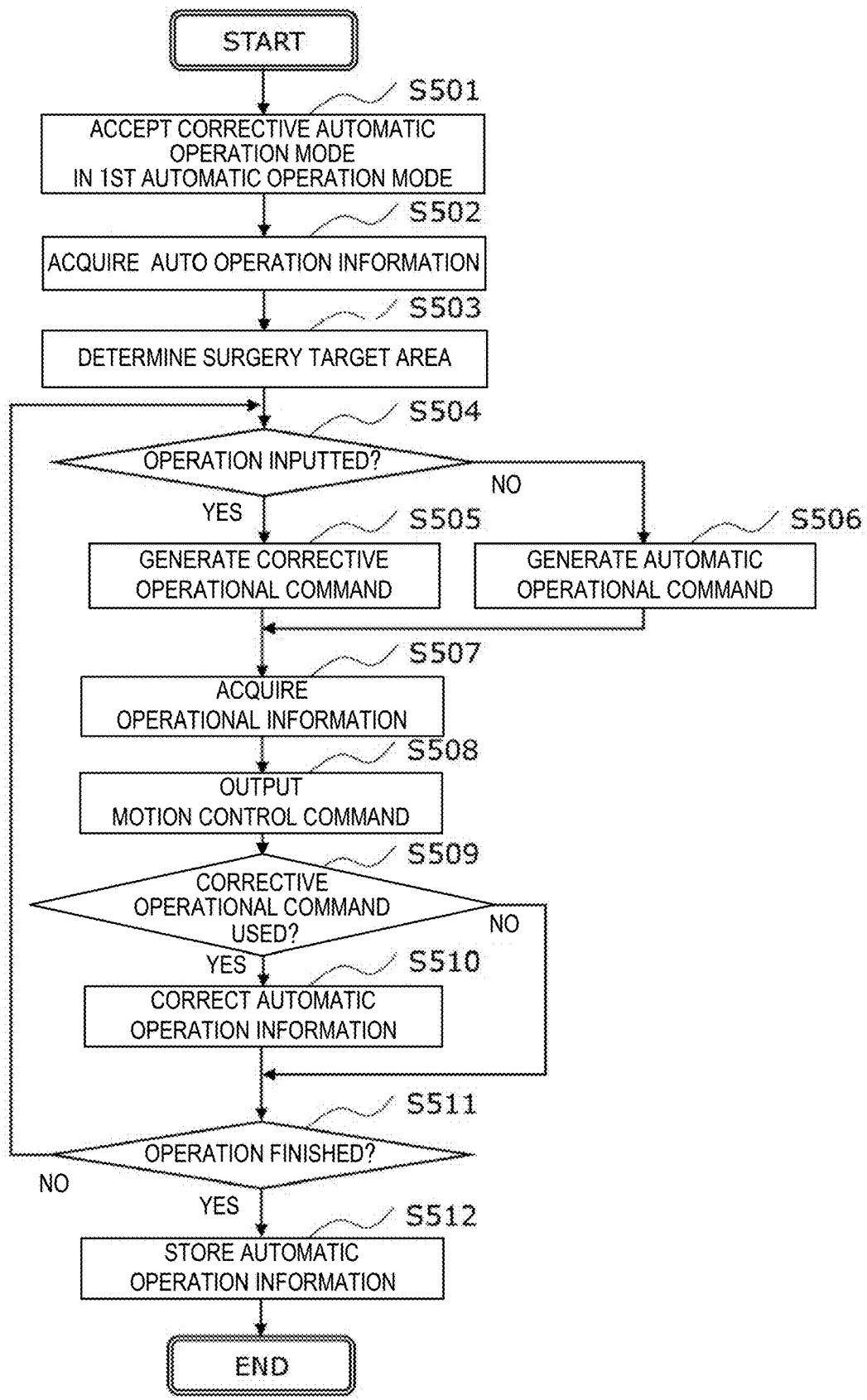
FIG. 7 is a flowchart illustrating one example of operation for performing a corrective automatic operation mode using the automatic operation in the first automatic operation mode in the surgical system according to this embodiment.

Regarding operation in the corrective automatic operation mode of the surgical system 100 according to this embodiment when performing a surgery to the patient, operation in the corrective automatic operation mode using the automatic operation in the first automatic operation mode is described. FIG. 7 is a flowchart illustrating one example of operation for performing the corrective automatic operation mode using the automatic operation in the first automatic operation mode of the surgical system 100 according to this embodiment.

As illustrated in FIG. 7, when performing a surgery to the patient, the operator S inputs an execution command of the corrective automatic operation mode in the first automatic operation mode, and information on the target surgery, by using the operation pedal 75 etc. of the user interface 71. The execution of the corrective automatic operation mode in the first automatic operation mode is an execution of the corrective automatic operation mode using the automatic operation in the first automatic operation mode. The second control device 32 accepts the command and the information, and transmits them to the first control device 31 (Step S501).

Next, the first control device 31 searches the automatic operation information stored in the memory 315, and reads and acquires the automatic operation information corresponding to the information on the target surgery (Step S502).

Next, the first control device 31 determines the position and the range of the surgery target area based on the input to the user interface 71 by the operator S (Step S503).

Next, the first control device 31 determines whether operation is inputted into the user interface 71 by the operator S (Step S504). In detail, the first control device 31 determines whether it received the manipulation operational command corresponding to the operation of the operator S from the second control device 32. If there is an input of the operation (i.e., if the manipulation operational command is received) (Yes at Step S504), the first control device 31 transits to Step S505. If there is no input of the operation (No at Step S504) (i.e., if the manipulation operational command is not received), the first control device 31 transits to Step S506. The manipulation operational command is an example of corrective manipulation information.

At Step S505, the first control device 31 generates a manual operational command based on the manipulation operational command, and transits to Step S507. That is, the first control device 31 corrects an automatic operational command based on the automatic operation information by replacing it with the manual operational command based on the manipulation operational command to generate a corrective operational command.

At Step S506, the first control device 31 generates the automatic operational command by using the automatic operation information, and transits to Step S507.

Next, the first control device 31 acquires the operational information from the robot body 2 (Step S507), generates the motion control command corresponding to the operational command by using the operational information as the feedback information, and outputs it to the robot body 2 (Step S508).

Next, the first control device 31 determines whether the motion control command is a command generated using the corrective operational command (Step S509). If the corrective operational command is used (Yes at Step S509), the first control device 31 transits to Step S510, and if the corrective operational command is not used (No at Step S509), it transits to Step S511.

At Step S510, the first control device 31 generates new automatic operation information by correcting the automatic operation information which is used by the first control device 31, by using the operational information acquired at Step S507. In detail, the first control device 31 corrects the information corresponding to the operational information described above in the automatic operation information. Note that, instead of the operational information described above, the first control device 31 may correct the automatic operation information by using the corrective operational command. For example, processing at Step S510 is performed by the information processing module 312.

Next, the first control device 31 determines whether all the operations of the robot body 2 according to the automatic operation information are finished (Step S511). If finished (Yes at Step S511), it transits to Step S512 and, if not finished (No at Step S511), it returns to Step S504.

At Step S512, the first control device 31 stores the new corrected automatic operation information in the memory 315. For example, processing at Step S512 is performed by the information processing module 312. By repeating the processings at Steps S504-S511, the correction of the automatic operation information may be performed more than once. The new corrected automatic operation information is information reflecting such more than one corrections. Then, the first control device 31 may replace (that is, update) the automatic operation information stored in the memory 315 with new automatic operation information. Note that, if the correction of the automatic operation information is not performed, the first control device 31 does not perform the storing it into the memory 315. After completion of Step S512, the first control device 31 ends the series of processings.

Note that the first control device 31 may generate the new automatic operation information by using the corrected automatic operation information and the automatic operation information before correction, and, for example, it may generate the new automatic operation information by combining the corrected automatic operation information with the automatic operation information before correction.

[Corrective Automatic Operation Mode in Second Automatic Operation Mode]

Figure 8:
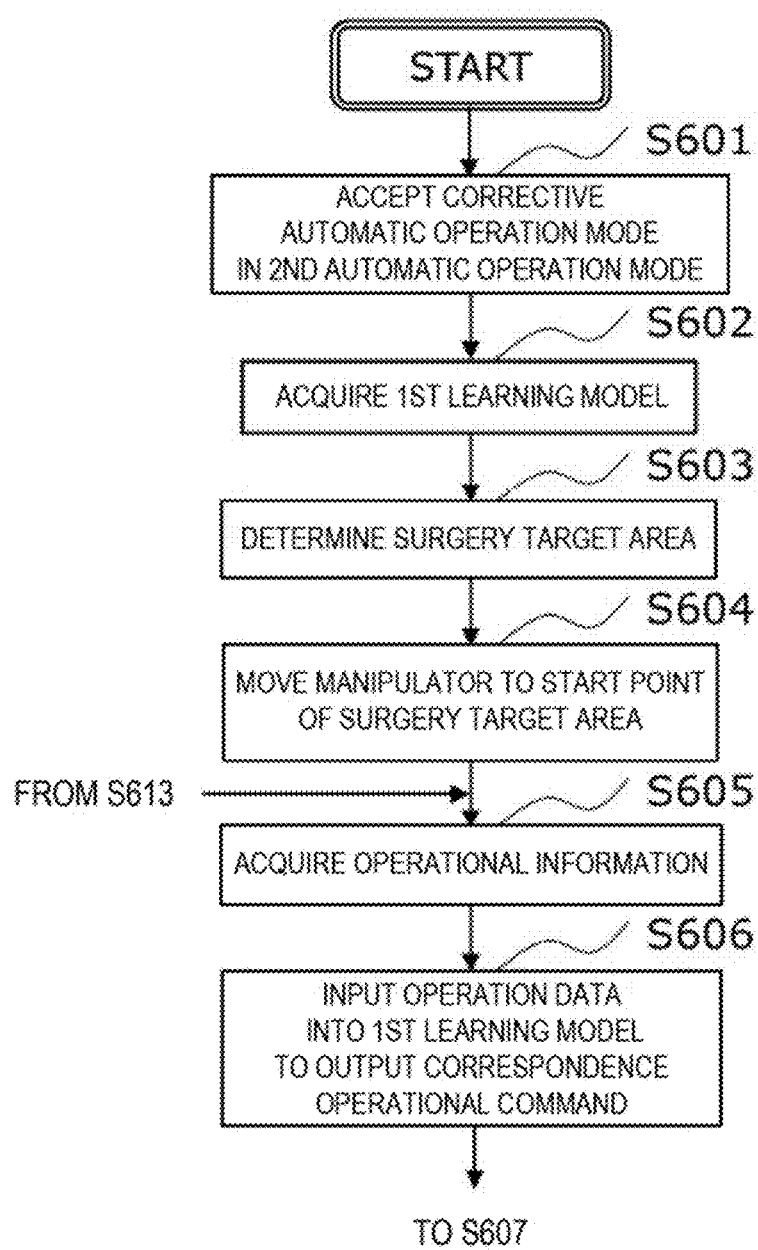
FIG. 8 is a flowchart illustrating one example of operation for performing a corrective automatic operation mode using the automatic operation in the second automatic operation mode in the surgical system according to this embodiment.
Figure 9:
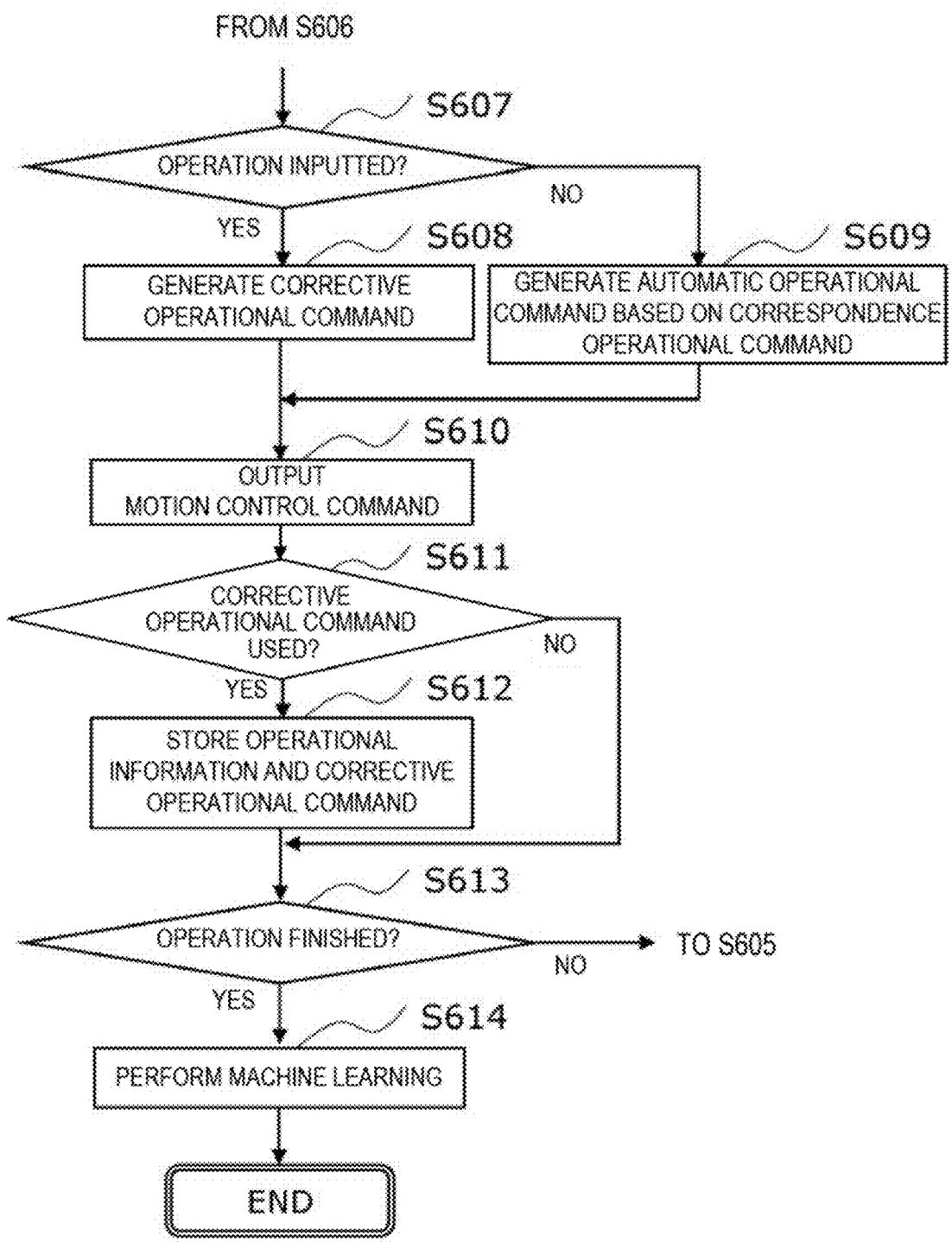
FIG. 9 is a flowchart illustrating one example of operation for performing the corrective automatic operation mode using the automatic operation in the second automatic operation mode in the surgical system according to this embodiment.

Operation of the surgical system 100 in the corrective automatic operation mode using the automatic operation in the second automatic operation mode is described. FIGS. 8 and 9 are flowcharts illustrating one example of operation for performing the corrective automatic operation mode using the automatic operation of the second automatic operation mode of the surgical system 100 according to this embodiment.

As illustrated in FIGS. 8 and 9, when performing a surgery to the patient, the operator S inputs an execution command of the corrective automatic operation mode in the second automatic operation mode, and information on the target surgery, by using the operation pedal 75 etc. of the user interface 71. The second control device 32 accepts the command and the information, and transmits them to the first control device 31 (Step S601).

Next, the first control device 31 searches the first machine learning model stored in the memory 315, and reads and acquires the first machine learning model corresponding to the information on the target surgery (Step S602).

Next, the first control device 31 performs processings at Steps S603-S606 similarly to the processings at Steps S303-S306 in the second automatic operation mode.

Next, the first control device 31 determines whether operation is inputted into the user interface 71 by the operator S, and the manipulation operational command is received from the second control device 32 (Step S607). If there is an input of the operation (Yes at Step S607), the first control device 31 transits to Step S608 and, if there is no input of the operation (No at Step S607), it transits to Step S609. The manipulation operational command is an example of corrective manipulation information.

At Step S608, the first control device 31 generates the manual operational command based on the manipulation operational command, generates a corrective operational command by replacing an automatic operational command based on the correspondence operational command with the manual operational command, and transits to Step S610.

At Step S609, the first control device 31 generates the automatic operational command based on the correspondence operational command, and transits to Step S610.

At Step S610, the first control device 31 generates the motion control command corresponding to the operational command by using the operational information acquired at Step S605 as the feedback information, and outputs it to the robot body 2.

Next, the first control device 31 determines whether the motion control command is a command generated using the corrective operational command (Step S611). If the corrective operational command is used (Yes at Step S611), the first control device 31 transits to Step S612, and if the corrective operational command is not used (No at Step S611), it transits to Step S613.

At Step S612, the first control device 31 associates the operational information acquired at Step S605 with the corrective operational command generated at Step S608, and stores it in the memory 315 as the learning data of the first machine learning model. For example, processing at Step S612 is performed by the information processing module 312.

Next, at Step S613, the first control device 31 determines whether all the operations of the robot body 2 in the corrective automatic operation mode are finished. If finished (Yes at Step S613), it transits to Step S614 and, if not finished (No at Step S613), it returns to Step S605.

At Step S614, the first control device 31 causes the first machine learning model to perform the machine learning by using the learning data stored in the memory 315 at Step S612. For example, processing at Step S614 is performed by the information processing module 312. The first machine learning model performs the machine learning, while using the operational information as input data, and using the corrective operational command associated with the operational information as teaching data. Note that the first control device 31 may convert the corrective operational command into a command of similar form to the correspondence operational command, and may use the converted command as the teaching data. By repeating the processings at Steps S605-S613, a plurality of combinations of the operational information and the corrective operational command may be generated. The first machine learning model performs the machine learning using the plurality of combinations. The first control device 31 ends the series of processings after completion of Step S614.

Note that the first control device 31 may perform the machine learning every time the automatic operation in the corrective automatic operation mode is finished like the example described above, or may perform the machine learning after a plurality of automatic operations in the corrective automatic operation mode are finished. Further, the first control device 31 may perform the machine learning according to a given temporal timing, such as a given time, given days, given weeks, and given months. By performing the machine learning every time the automatic operation in the corrective automatic operation mode is finished, the output accuracy of the first machine learning model can be improved every time the automatic operation in the corrective automatic operation mode ends. This is similar in the corrective automatic operation mode using the automatic operation of the third automatic operation mode which will be described below.

During the processings at Steps S605-S613, if there is an input of the operation into the user interface 71, the first control device 31 and the second control device 32 may perform similar processings to the processings at Steps S107-S108 in the manual operation mode, and give a feedback of the operational information from the robot body 2 to the operation manipulators 72L and 72R.

[Corrective Automatic Operation Mode in Third Automatic Operation Mode]

Figure 10:
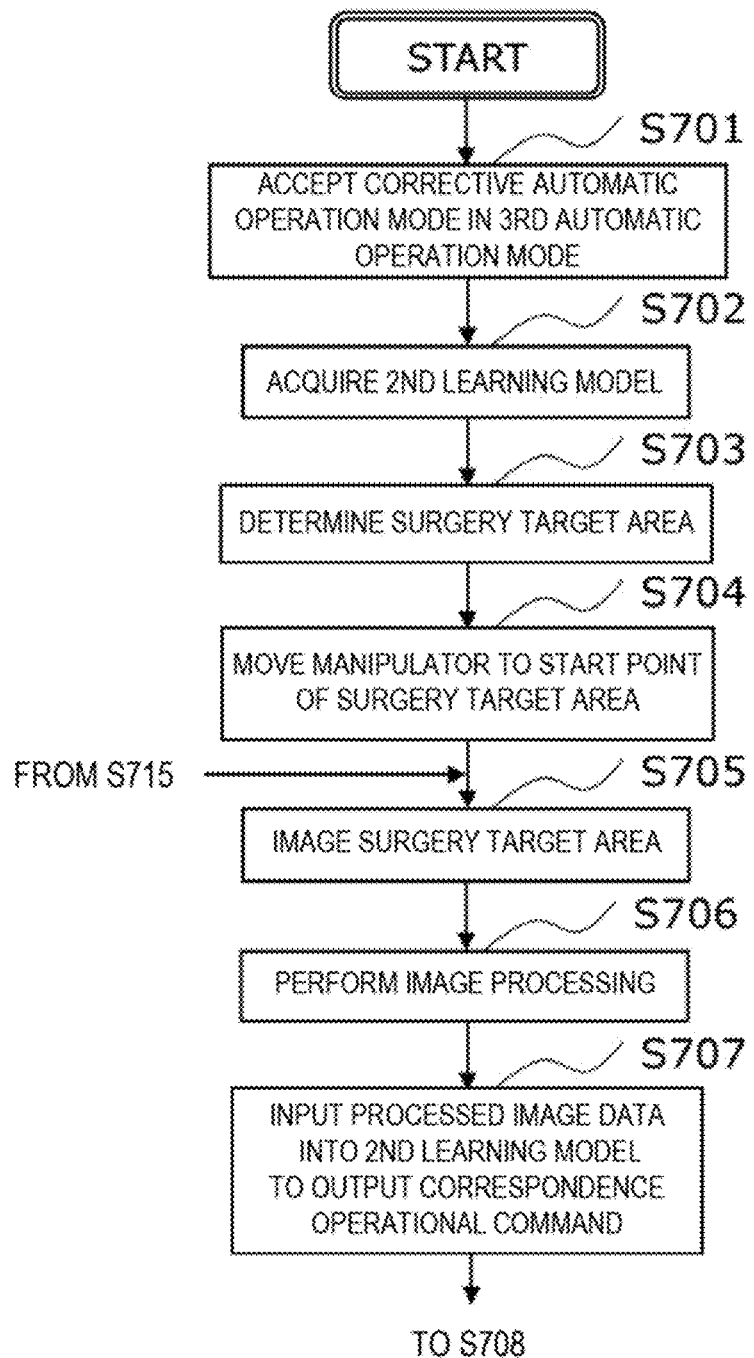
FIG. 10 is a flowchart illustrating one example of operation for performing a corrective automatic operation mode using the automatic operation in the third automatic operation mode in the surgical system according to this embodiment.
Figure 11:
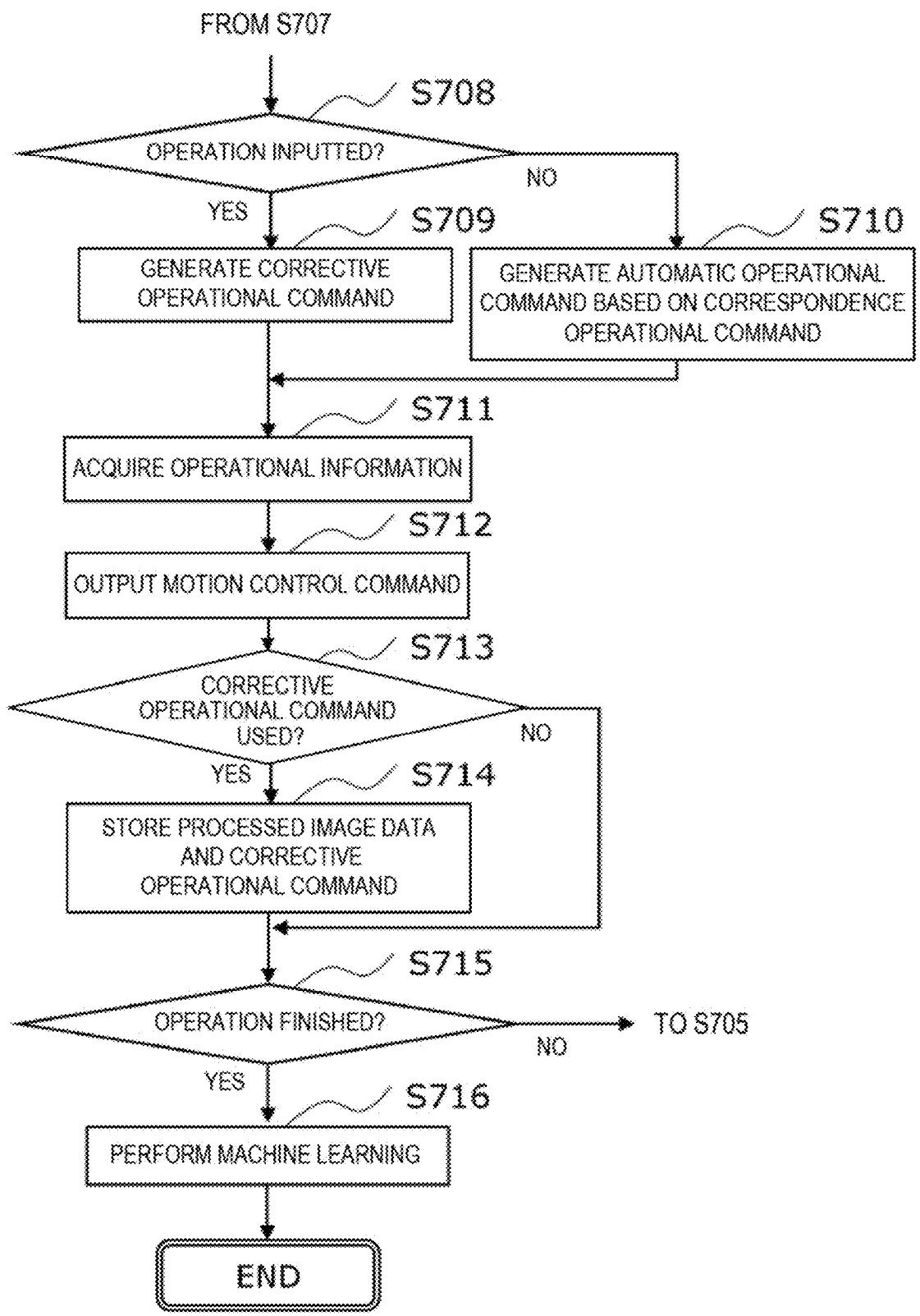
FIG. 11 is a flowchart illustrating one example of operation for performing the corrective automatic operation mode using the automatic operation in the third automatic operation mode in the surgical system according to this embodiment.

Operation of the surgical system 100 in the corrective automatic operation mode using the automatic operation of the third automatic operation mode is described. FIGS. 10 and 11 are flowcharts illustrating one example of operation for performing the corrective automatic operation mode using the automatic operation of the third automatic operation mode of the surgical system 100 according to this embodiment.

As illustrated in FIGS. 10 and 11, when performing a surgery to the patient, the operator S inputs an execution command of the corrective automatic operation mode in the third automatic operation mode, and information on the target surgery using the operation pedal 75 etc. of the user interface 71. The second control device 32 accepts the command and the information, and transmits them to the first control device 31 (Step S701).

Next, the first control device 31 searches the second machine learning model stored in the memory 315, and reads and acquires the second machine learning model corresponding to the information on the target surgery (Step S702).

Next, the first control device 31 performs processings at Steps S703-S707 similarly to the processings at Steps S403-S407 in the third automatic operation mode.

Next, the first control device 31 determines whether operation is inputted into the user interface 71 by the operator S, and the manipulation operational command is received from the second control device 32 (Step S708). If there is an input of the operation (Yes at Step S708), the first control device 31 transits to Step S709, and if there is no input of the operation (No at Step S708), it transits to Step S710. The manipulation operational command is an example of corrective manipulation information.

At Step S709, the first control device 31 generates the manual operational command as a corrective operational command based on the manipulation operational command, and transits to Step S711.

At Step S710, the first control device 31 generates an automatic operational command based on the correspondence operational command, and transits to Step S711.

At Step S711, the first control device 31 acquires the operational information from the robot body 2. Further, at Step S712, the first control device 31 generates the motion control command corresponding to the operational command by using the operational information as the feedback information, and outputs it to the robot body 2.

Next, the first control device 31 determines whether the motion control command is a command generated using the corrective operational command (Step S713). If the corrective operational command is used (Yes at Step S713), the first control device 31 transits to Step S714, and if the corrective operational command is not used (No at Step S713), it transits to Step S715.

At Step S714, the first control device 31 associates the image data after image processing generated at Step S706 with the corrective operational command generated at Step S709, and stores it in the memory 315 as the learning data of the second machine learning model. For example, processing at Step S714 is performed by the information processing module 312.

Next, at Step S715, the first control device 31 determines whether all the operations of the robot body 2 in the corrective automatic operation mode are finished, and if finished (Yes at Step S715), it transits to Step S716 and, if not finished (No at Step S715), it returns to Step S705.

At Step S716, the first control device 31 causes the second machine learning model to perform the machine learning by using the learning data stored in the memory 315 at Step S714. For example, processing at Step S716 is performed by the information processing module 312. The second machine learning model performs the machine learning by using the image data after image processing as the input data, and using the corrective operational command associated with the image data as the teaching data. Note that the first control device 31 may convert the corrective operational command into a command of similar form to the correspondence operational command, and use the converted command as the teaching data. By repeating the processings at Steps S705-S715, a plurality of combinations of the image data after image processing and the corrective operational command may be generated. The second machine learning model performs the machine learning using the plurality of combinations. The first control device 31 ends the series of processings after completion of Step S716.

During the processings at Steps S705-S715, when there is an input of the operation into the user interface 71, the first control device 31 and the second control device 32 may perform similar processings to the processings at Steps S107-S108 in the manual operation mode, and give a feedback of the operational information from the robot body 2 to the operation manipulators 72L and 72R.

[Machine Learning of First Machine Learning Model]

The first machine learning model according to this embodiment is comprised of a neural network. The first machine learning model uses the operational information of the robot body 2 as the input data, and outputs the correspondence operational command indicative of the surgical operation to be performed by the robot body 2 in the state of the operational information as the output data. Further, in the machine learning, the first machine learning model uses the operational information of the robot body 2 as the input data for learning, and uses an operation corresponding information which is information generated in order to operate the robot body 2 in the state of the operational information as the teaching data. Further, the weight between the nodes of the neural network is adjusted by a backward calculation so that a difference between the output data when the input data for learning is inputted into the first machine learning model, and the teaching data becomes zero (match) or minimized. Therefore, the first machine learning model is optimized.

The learning data used by the first machine learning model may be various kinds of data. For example, the learning data is data relevant to the operation of the robot body 2 which is operated using the user interface 71. For example, one of the learning data is the operational information of the robot body 2 which is acquired during the manual operation of the robot body 2 in the manual operation mode, and the operation corresponding information. Further, one of the learning data is the operational information of the robot body 2 corresponding to the corrective operation applied to the robot body 2, and the operation corresponding information, in the corrective automatic operation mode using the first automatic operation mode. Further, one of the learning data is the operational information of the robot body 2 corresponding to the corrective operation applied to the robot body 2, and the operation corresponding information, in the corrective automatic operation mode using the second automatic operation mode. Moreover, the learning data may be the operational information described above which are acquired during operation of other robots and the operation corresponding information.

Such operation corresponding information may be information and commands which are generated by the first control device 31 and the second control device 32 corresponding to the input of the operation into the user interface 71. For example, it may be the manipulation operational command, the manual operational command, the corrective operational command, etc.

Such a first machine learning model can carry out the machine learning using the learning data acquired in the past. Further, the first machine learning model can carry out the machine learning using the learning data acquired by other robots. Further, the first machine learning model can carry out the machine learning using the learning data acquired by the robot body 2 operating for an actual surgery etc.

[Machine Learning of Second Machine Learning Model]

The second machine learning model according to this embodiment is comprised of a neural network. The second machine learning model uses the image data of the surgery target area, as the input data, and outputs the correspondence operational command indicative of the surgical operation to be performed by the robot body 2 to the surgery target area in the state of the image data, as the output data. Further, in the machine learning, the second machine learning model uses the image data of the surgery target area, as the input data for learning, and uses the image data corresponding information generated in order to operate the robot body 2 to the surgery target area of the image data, as the teaching data. Further, the weight between the nodes of the neural network is adjusted by a backward calculation so that a difference between the output data when the input data for learning is inputted into the second machine learning model, and the teaching data becomes zero (match) or minimized. Therefore, the second machine learning model is optimized.

In this embodiment, the image data as the input data is image data after image processing in the first control device 31. However, the image processing in the first control device 31 may be omitted by constructing the neural network so that it includes the processing layer of the image processing.

The learning data used by the second machine learning model may be various kinds of data. For example, the learning data is data relevant to the operation of the robot body 2 operated using the user interface 71. For example, one of the learning data is the image data of the surgery target area acquired during the manual operation of the robot body 2 in the manual operation mode, and the image data corresponding information. One of the learning data is the image data of the surgery target area when the corrective operation is applied to the robot body 2, and the image data corresponding information in the corrective automatic operation mode using the third automatic operation mode. Further, the learning data may be the image data acquired in the operation of other robots, and the image data corresponding information.

Such image data corresponding information may be information and commands generated by the first control device 31 and the second control device 32 corresponding to the input of the operation into the user interface 71, or may be operational information of the robot body 2 which is operated corresponding to the input of the operation into the user interface 71. For example, the information and the command may be the manipulation operational command, the manual operational command, the corrective operational command, etc.

Such a second machine learning model can carry out the machine learning using the learning data acquired in the past. Further, the second machine learning model can carry out the machine learning using the learning data acquired in other robots. Further, the second machine learning model can carry out the machine learning using the learning data acquired by the robot body 2 operating for an actual surgery etc.

Other Embodiments

As described above, although examples of the embodiment of the present disclosure are described, the present disclosure is not limited to the above embodiment. That is, various modifications and improvements are possible within the scope of the present disclosure. For example, applying various modifications to the above embodiment, and combining components in different embodiments are also encompassed within the scope of the present disclosure.

For example, although in the above embodiment the operation mode of the robot 1 is described as being performed individually, it is not limited to this configuration. For example, the first control device 31 may sequentially perform a plurality of operation modes to a single surgery target part. For example, at least either before or after the automatic operation mode for controlling the robot 1 according to the automatic operational command, the first control device 31 may perform the manual operation mode for controlling the robot 1 according to the manual operational command. Alternatively, at least either before or after the corrective automatic operation mode, the first control device 31 may perform the manual operation mode.

Further, although the surgical system 100 according to this embodiment includes one robot 1 and one console 7, it is not limited to this configuration. The surgical system 100 may include one or more robots 1 and one or more consoles 7.

For example, the surgical system 100 may be provided with a plurality of robots 1 and a plurality of consoles 7. The control device 3 may selectively connect one of the plurality of robots 1 to one of the plurality of consoles 7. Further, the memory 315 may store a combination of the robot 1 and the console 7 during a surgery, and an executing order of the combinations. The control device 3 may connect the selected one of the plurality of robots 1 to the selected one of the plurality of consoles 7 according to the combinations and the executing order of the combinations stored in the memory 315. The control device 3 can function as a connection controlling module.

Alternatively, the control device 3 may accept an input of a command for specifying a combination of the robot 1 and the console 7 during a surgery, and an executing order of the combinations, from at least one of the plurality of consoles 7. Then, the control device 3 may connect the selected one of the plurality of robots 1 to the selected one of the plurality of consoles 7 according to the input described above.

Further, when the surgical system 100 is provided with a plurality of robots 1 and a plurality of consoles 7, the operation mode to be performed may be set for each robot. For example, for one surgery target part, a robot 1 which performs the manual operation mode, and a robot 1 which performs one of the first to third automatic operation modes or the corrective automatic operation mode using one of the first to third automatic operation modes may be set. Further, each robot 1 may be set for one surgery target part to perform an operation in its own operation mode and/or a surgical operation suitable for the capability etc. of the operator S who operates manually.

Moreover, in the surgical system 100 according to the above embodiment, the control device 3 may store in the memory 315 information on a no-entry area which is an area in the surgery target area into which a surgical instrument cannot enter. Then, the control device 3 may control the robot body 2 so that the surgical instrument does not enter into the no-entry area in any of the operation modes. Note that a three-dimensional position of the no-entry area may be stored beforehand in the memory 315. Alternatively, the control device 3 may detect the no-entry area by carrying out image processing of the image of the surgery target area imaged by the endoscope camera, and may further detect the three-dimensional position of the no-entry area.

Further, the technique of the present disclosure may be a controlling method. For example, the controlling method according to the present disclosure is a method of controlling a robot which performs a surgical operation, which includes generating an automatic operational command for causing the robot to automatically perform the surgical operation, and causing the robot to perform the surgical operation according to the automatic operational command. According to this controlling method, similar effects to the surgical system 100 described above can be acquired. Such a controlling method may be implemented by a circuit, such as a CPU or an LSI, or an IC card, or a sole module.

Further, the technique of the present disclosure may be a program for performing the controlling method described above, or may be a non-transitory computer readable recording medium on which the program is recorded. It is needless to say that the program described above may be distributed via a transmission medium, such as the Internet.

Note that all the numbers used above, such as the order and the quantity are illustrated in order to concretely explain the technique of the present disclosure, and the present disclosure is not limited to the illustrated numbers. Further, the connection relationships between the components are illustrated in order to concretely explain the technique of the present disclosure, and the connection relationship which realizes the functions of the present disclosure is not limited to those relationships.

The division of a block in the functional block diagram is one example, and therefore, a plurality of blocks may be realized as the one block, one block is divided into a plurality of blocks, and/or a part of the function may be moved to other blocks. Further, functions of a plurality of blocks which have similar functions may be processed in parallel or in a time-divided manner by sole hardware or software.

The invention claimed is:

1. A surgical system, comprising:
a robot including an instrument manipulator that has a surgical instrument;
control circuitry that controls the robot; and
a user interface that receives an input of a command and outputs the command to the control circuitry,
wherein the control circuitry generates an automatic operational command for causing the robot to automatically perform a surgical operation, and controls the surgical operation of the robot according to the automatic operational command, and the control circuitry generates the automatic operational command according to automatic operation information, wherein the control circuitry includes a memory that stores the automatic operation information that is information for causing the robot to automatically perform the surgical operation, and the robot can perform the surgical operation in a manual operation mode, an automatic operation mode, and a corrective automatic operation mode, wherein the manual operation mode is an operation mode for operating the robot according to commands inputted by the user interface, the automatic operation mode is an operation mode for automatically operating the robot according to the automatic operation information stored in the memory and during the automatic operation mode, commands from operation of the user interface are not reflected in the operation of the robot, and the corrective automatic operation mode is an operation mode in which while the robot is controlled by the automatic operation mode, an operation to be performed automatically is corrected by using the user interface, and the corrected operation to be performed automatically is combined with automatic operation information before correction to generate new automatic operation information, wherein the control circuitry is configured to:

receive, from the user interface, corrective manipulation information that is manipulation information for correcting operation of the robot automatically performing the surgical operation according to the automatic operational command, wherein the corrective manipulation information is generated by operating the user interface manually in the corrective automatic operation mode, control the robot to perform a corrective operation that is an operation corrected from the operation according to the automatic operational command, store, in the memory, information for causing the robot to perform the corrective operation as the automatic operation information, and control the surgical operation of the robot according to the automatic operational command generated using the latest automatic operation information stored in the memory.

2. The surgical system of claim 1, wherein the memory stores a plurality of automatic operation information, and wherein the control circuitry selects the automatic operation information to be used for generating the automatic operational command from the plurality of automatic operation information stored in the memory.

3. The surgical system of claim 1, wherein the memory stores a plurality of automatic operation information, and wherein the control circuitry generates new automatic operation information by using the plurality of automatic operation information stored in the memory.

4. The surgical system of claim 1, wherein the control circuitry includes:

the memory that stores a first machine learning model, operational information of the robot, and first information indicative of a manual operation of the robot or a corrective operation performed to the automatic operation of the robot, wherein the control circuitry causes the first machine learning model to carry out machine learning using the operational information and the first information corresponding to the operational information, wherein the first machine learning model after the machine learning uses the operational information as input data, and uses a correspondence operational command corresponding to the operational information as output data, and wherein the control circuitry generates the automatic operational command based on the correspondence operational command of the first machine learning model.

5. The surgical system of claim 1, wherein the control circuitry includes the memory that stores a second machine learning model, image data of a target of processing of the surgical operation of the robot, and second information indicative of operation of the robot to the target of the image data, wherein the control circuitry causes the second machine learning model to carry out machine learning using the image data of the target, and the second information for the target of the image data, wherein the second machine learning model after the machine learning uses the image data as input data, and uses a correspondence operational command corresponding to the image data as output data, and wherein the control circuitry generates the automatic operational command based on the correspondence operational command of the second machine learning model.

6. The surgical system of claim 5, wherein the robot further includes an endoscope manipulator that has an endoscope camera, and wherein the second machine learning model uses image data captured by the endoscope camera as the image data of the target.

7. The surgical system of claim 1, wherein the control circuitry receives, from the user interface, an input of a command for specifying a start point and an end point for the robot to automatically perform the surgical operation, and causes the robot to automatically perform the surgical operation for a part between the start point and the end point.

8. The surgical system of claim 1, further comprising a camera that images a surgery target area, wherein the control circuitry is configured to:
specify the surgery target area by processing an image of the surgery target area imaged by the camera;
determine a start point and an end point of a surgical operation in the surgery target area; and
cause the robot to automatically perform the surgical operation for a part between the start point and the end point.

9. The surgical system of claim 1, wherein the control circuitry is configured to:

receive, from the user interface, manual manipulation information that is manipulation information for causing the robot to perform a surgical operation by a manual operation;

generate a manual operational command for operating the robot according to the manual manipulation information; and control the surgical operation of the robot according to the manual operational command, and wherein, at least either before or after the control of the robot according to the automatic operational command, the control circuitry receives the manual manipulation information, and controls the robot according to the manual operational command.

10. The surgical system of claim 1, wherein the user interface includes a plurality of user interfaces, and wherein the control circuitry is configured to:

receive, from one selected from the plurality of user interfaces, manual manipulation information that is manipulation information for causing the robot to perform a surgical operation by a manual operation;

generate a manual operational command for operating the robot according to the manual manipulation information; and control the surgical operation of the robot according to the manual operational command.

11. The surgical system of claim 1, wherein the robot includes a plurality of robots, and the user interface includes a plurality of user interfaces, wherein the control circuitry includes
the memory that stores a combination of the robot and the user interface during a surgery, and an executing order of the combinations, and
wherein the control circuitry selectively connects one of the plurality of robots to one of the plurality of user interfaces according to the combination and the executing order of the combinations stored in the memory.

12. The surgical system of claim 1, wherein the robot includes a plurality of robots, and the user interface includes a plurality of user interfaces, wherein the control circuitry receives, from at least one of the plurality of user interfaces, an input of a command for specifying a combination of the robot and the user interface during a surgery, and an executing order of the combinations, and selectively connects one of the plurality of robots to one of the plurality of user interfaces.

13. A method of controlling a robot that performs a surgical operation, comprising:

generating an automatic operational command for causing the robot to automatically perform the surgical operation, wherein the automatic operation command is generated according to automatic operation information;

controlling the robot to perform the surgical operation according to the automatic operational command;

storing, in a memory, the automatic operation information that is information for causing the robot to automatically perform the surgical operation, and the robot can perform the surgical operation in a manual operation mode, an automatic operation mode, and a corrective automatic operation mode, wherein the manual operation mode is an operation mode for operating the robot according to commands inputted by a user interface, the automatic operation mode is an operation mode for automatically operating the robot according to the automatic operation information stored in the memory and during the automatic operation mode, commands from operation of the user interface are not reflected in the operation of the robot, and the corrective automatic operation mode is an operation mode in which while the robot is controlled by the automatic operation mode, an operation to be performed automatically is corrected by using the user interface, and the corrected operation to be performed automatically is combined with automatic operation information before correction to generate new automatic operation information;

generating the automatic operational command according to the automatic operation information;

receiving, from the user interface, corrective manipulation information that is manipulation information for correcting operation of the robot automatically performing the surgical operation according to the automatic operational command, wherein the corrective manipulation information is generated by operating the user interface manually in the corrective automatic operation mode;

controlling the robot to perform a corrective operation that is an operation corrected from the operation according to the automatic operational command;

storing, in the memory, information for causing the robot to perform the corrective operation as the automatic operation information; and controlling the surgical operation of the robot according to the automatic operational command generated using the latest automatic operation information stored in the memory.

14. The controlling method of claim 13, further comprising:

inputting operational information of the robot into a first machine learning model as input data, and causing the first machine learning model to output a correspondence operational command of the robot as output data;

generating the automatic operational command based on the correspondence operational command; and causing the first machine learning model to carry out machine learning using first information indicative of a manual operation of the robot or a corrective operation performed to the automatic operation of the robot by using the user interface, and the operational information corresponding to the first information, and wherein the correspondence operational command outputted from the first machine learning model is a command corresponding to the operational information of the robot.

15. The controlling method of claim 13, further comprising:

inputting image data of a target of processing of a surgical operation of the robot into a second machine learning model as input data, and causing the second machine learning model to output a correspondence operational command of the robot as output data, wherein the generating the automatic operational command includes generating the automatic operational command based on the correspondence operational command, the method further comprising causing the second machine learning model to carry out machine learning using image data of the target, and second information indicative of operation of the robot to the target of the image data, wherein the correspondence operational command outputted from the second machine learning model is a command corresponding to operational information of the robot.

* * * * *